(12) United States Patent
Nishikawa et al.

(10) Patent No.: US 12,104,784 B2
(45) Date of Patent: Oct. 1, 2024

(54) DIFFUSION MEMBER, STACKED BODY, DIFFUSION MEMBER SET, LED BACKLIGHT, AND DISPLAYING APPARATUS

(71) Applicant: DAI NIPPON PRINTING CO., LTD., Tokyo-to (JP)

(72) Inventors: Marii Nishikawa, Tokyo-to (JP); Seiichi Yoshimi, Tokyo-to (JP); Keita Arihara, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 54 days.

(21) Appl. No.: 17/622,998

(22) PCT Filed: Jun. 23, 2020

(86) PCT No.: PCT/JP2020/024644
§ 371 (c)(1),
(2) Date: Dec. 27, 2021

(87) PCT Pub. No.: WO2021/002247
PCT Pub. Date: Jan. 7, 2021

(65) Prior Publication Data
US 2022/0228722 A1    Jul. 21, 2022

(30) Foreign Application Priority Data

Jul. 1, 2019 (JP) .................. 2019-123162
Jul. 1, 2019 (JP) .................. 2019-123165
Apr. 27, 2020 (JP) .................. 2020-078355

(51) Int. Cl.
*F21V 5/00* (2018.01)
*G02B 5/02* (2006.01)
*G02B 5/18* (2006.01)

(52) U.S. Cl.
CPC ............ *F21V 5/002* (2013.01); *G02B 5/0247* (2013.01); *G02B 5/0284* (2013.01); *G02B 5/1866* (2013.01); *G02B 2005/1804* (2013.01)

(58) Field of Classification Search
None
See application file for complete search history.

(56) References Cited

U.S. PATENT DOCUMENTS 7,222,993 B2 *  5/2007  Kikuchi .................. H01L 33/60
                                                            257/E33.072
2003/0231394 A1  12/2003  Kimura
(Continued)

FOREIGN PATENT DOCUMENTS

JP      S58-133645 A    8/1983
JP      2002-372605 A  12/2002
(Continued)

*Primary Examiner* — Ashok Patel
(74) *Attorney, Agent, or Firm* — Oliff PLC

(57) ABSTRACT

A diffusion member includes a first layer and a second layer, in this order, wherein the first layer has a light transmissivity and a light diffusivity, in the second layer, a reflectance of light increases as an absolute value of an incident angle with respect to a first layer side surface of the second layer decreases, and a transmittance of light increases as an absolute value of an incident angle with respect to a first layer side surface of the second layer increases.

7 Claims, 17 Drawing Sheets

(56) References Cited

U.S. PATENT DOCUMENTS

| | | | |
|---|---|---|---|
| 2009/0161221 A1* | 6/2009 | Yang | G02F 1/133606 |
| | | | 359/599 |
| 2009/0207586 A1 | 8/2009 | Arai et al. | |
| 2010/0031544 A1* | 2/2010 | Hwang | G09F 13/0409 |
| | | | 40/564 |
| 2013/0121016 A1 | 5/2013 | Kim et al. | |
| 2015/0338054 A1* | 11/2015 | Kim | F21S 43/26 |
| | | | 362/509 |
| 2019/0097094 A1 | 3/2019 | Han et al. | |
| 2019/0218430 A1 | 7/2019 | Nishijima et al. | |

FOREIGN PATENT DOCUMENTS

| | | | |
|---|---|---|---|
| JP | 2009-192915 A | | 8/2009 |
| JP | 5062408 B2 | | 10/2012 |
| JP | 2013-152865 A | | 8/2013 |
| JP | 2013-535766 A | | 9/2013 |
| JP | 2016-078260 A | | 5/2016 |
| JP | 2017-92021 A | | 5/2017 |
| JP | 2018-67441 A | | 4/2018 |
| JP | 2018-197336 A | | 12/2018 |
| JP | 2019-61954 A | | 4/2019 |
| JP | 2019-062116 A | | 4/2019 |
| KR | 10-2003-0046414 A | | 6/2003 |
| KR | 101161696 | * | 6/2012 |
| KR | 10-2019-0035491 A | | 4/2019 |
| WO | 2017/163608 A1 | | 9/2017 |

\* cited by examiner

FIG. 3
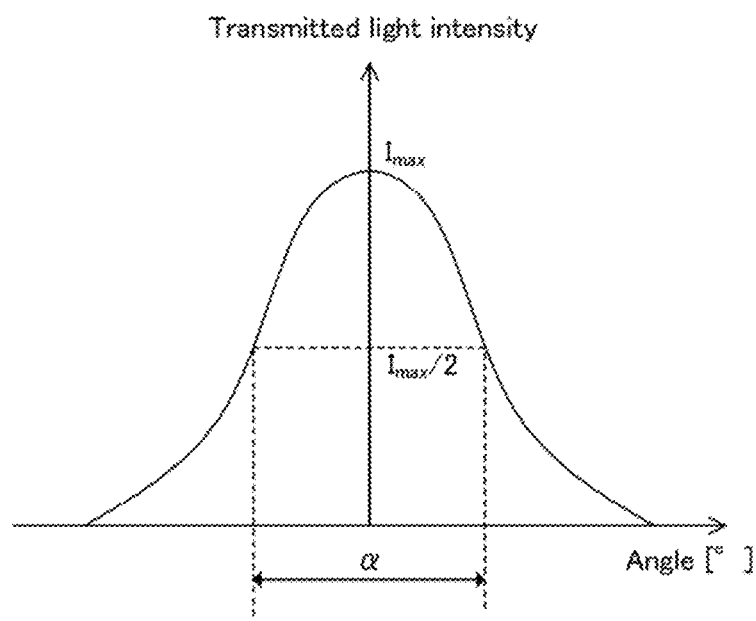
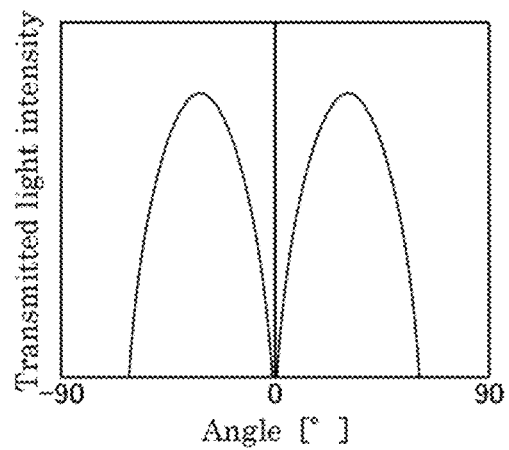
FIG. 4A
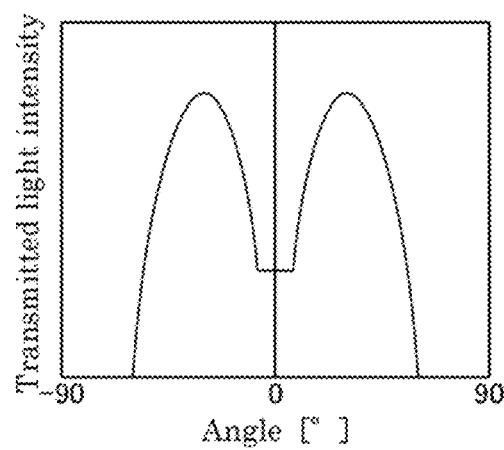
FIG. 4B
FIG. 5
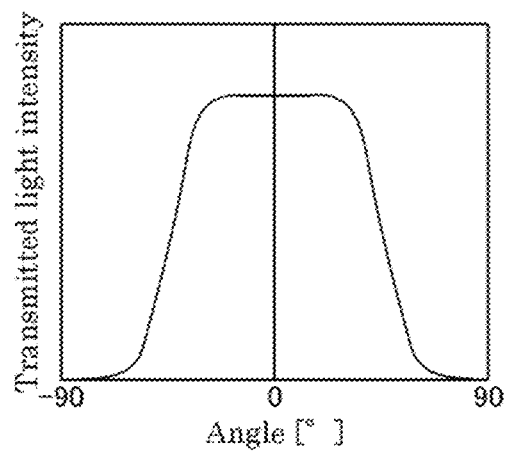

FIG. 21
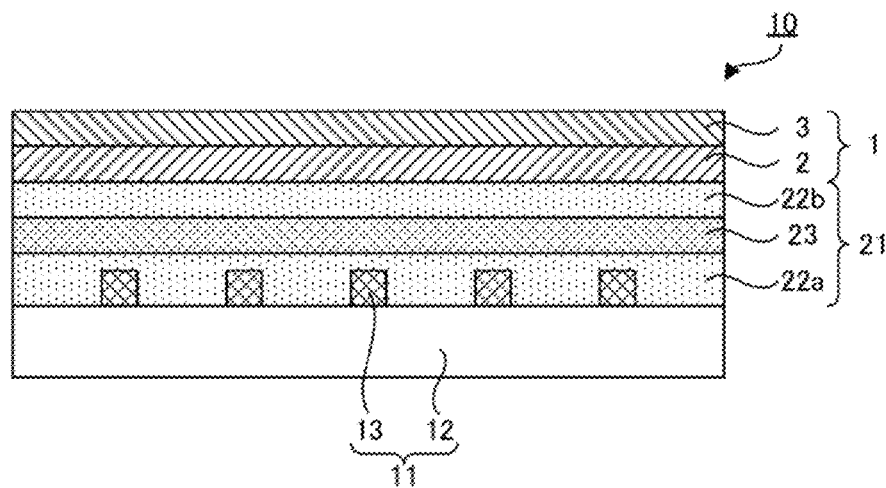
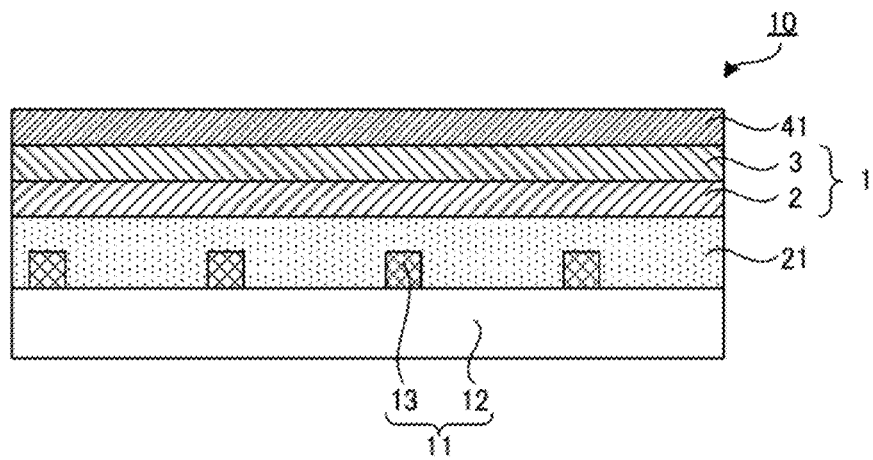
FIG. 22A
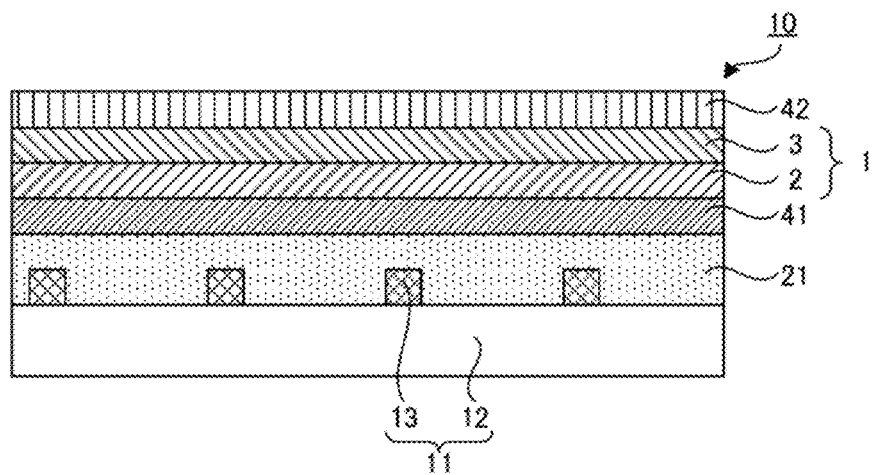
FIG. 22B

DIFFUSION MEMBER, STACKED BODY, DIFFUSION MEMBER SET, LED BACKLIGHT, AND DISPLAYING APPARATUS

TECHNICAL FIELD

The present disclosure relates to a diffusion member used for, for example, a downlight type system LED backlight, a stacked body, and a diffusion member set, as well as a LED backlight and a displaying apparatus using the same.

BACKGROUND ART

Recently, a displaying apparatus, such as a liquid crystal display, using an LED backlight as a light source is rapidly spreading.

Here, the LED backlight is roughly classified into a downlight type system and an edge light type system. For a small or medium size displaying apparatus such as a mobile terminal such as a smartphone, an edge light system LED backlight is usually used in many cases. However, from the viewpoint of brightness, it has been studied to use a downlight type system LED backlight. Meanwhile, in a large displaying apparatus such as a large screen liquid crystal television, the downlight type system LED backlight is used in many cases.

The downlight type system LED backlight has a configuration wherein a plurality of LED elements are placed on a substrate. In such a downlight type system LED backlight, by independently controlling a plurality of LED elements, it is possible to realize so-called local dimming wherein the brightness of each area of the LED backlight is adjusted according to the brightness and darkness of display graphic. Thereby, it is possible to achieve a large improvement of contrast and low power consumption of the displaying apparatus.

In the downlight type system LED backlight, the diffusion plate is placed above the LED element from the viewpoint of suppressing the luminance unevenness, for example.

CITATION LIST

Patent Literatures

Patent Literature 1: Japanese Patent Application Laid-Open (JP-A) No. 2018-67441
Patent Literature 2: JP-A No. 2017-92021
Patent Literature 3: Japanese Patent No. 5062408
Patent Literature 4: JP-A No. 2019-61954

SUMMARY OF DISCLOSURE

Technical Problem

However, in the downlight type system LED backlight, in order to suppress the luminance unevenness, it is necessary to place the LED element and the diffusion plate apart. Therefore, the reduction of the thickness of the displaying apparatus is difficult. In particular, when the number of LED elements is reduced in order to reduce cost and power consumption, luminance unevenness is likely to occur, since the placing distance between the LED elements is widened. In this case, it is necessary to increase the distance between the LED element and the diffusion plate, so that the reduction of the thickness will be more difficult. Therefore, in a conventional downlight type system LED backlight, there is a problem that it is difficult to realize uniform luminance and the reduction of the thickness at the same time.

Further, in order to improve in-plane uniformity of luminance, further placement of a transmission reflector between the LED element and the diffusion plate, is proposed (refer to, for example, Patent Literature 1). The transmission reflector includes a reflective portion and a transmission portion in a pattern form. More specifically, it has a pattern such that the reflective portion is placed directly above the LED element, and the transmission portion gradually increases from directly above the LED element toward the periphery. Thereby, the light directly above the LED element is reflected and diffused around so as to emit from the surrounding transmission portion, so that the in-plane uniformity of luminance may be improved.

However, even in the case of using such a transmission reflector, in order to suppress the luminance unevenness, it is necessary to place the LED element and the transmission reflector apart, so that it is difficult to reduce the thickness. Also, since the transmission reflector includes a reflective portion and a transmission portion in a pattern form, and the reflective portion is placed directly above the LED element, it is necessary to align the LED element and the transmission reflector.

Also, for uniform luminance and the reduction of the thickness, for example, Patent Literature 2 proposes to place a half mirror, that reflects a part of the incident light and transmits a part of the incident light, between an LED element and a diffusion plate, and to use the half mirror as a half mirror wherein the reflectance of an tilted incident light is lower than that of a vertical incident light.

Further, for uniform luminance, for example, Patent Literature 3 proposes to place a diffractive optical element for a backlight between the LED elements and the diffusion plate, that transmits and diffracts light from a light source, and emits a transmission diffraction light with an annular intensity distribution wherein a transmission diffraction light intensity emitted to a surrounding part is stronger, compared to a transmission diffraction light intensity larger than 0, emitted to an optical axis center.

The present disclosure has been made in view of the above circumstances, and a main object thereof is to provide a diffusion member, a stacked body, a diffusion member set, an LED backlight and a displaying apparatus capable of improving the in-plane uniformity of luminance, while reducing the thickness.

Solution to Problem

As a result of intensive studies to solve the above described problems, the present inventors have found that by using a layer having light transmissivity and light diffusivity and a layer having incident angle dependency in reflectance and transmittance, in combination, as a diffusion member, it is possible to improve the in-plane uniformity of luminance, while reducing the thickness, thereby completing the present invention.

That is, an embodiment of the present disclosure provides a diffusion member comprising a first layer and a second layer, in this order, wherein the first layer has a light transmissivity and a light diffusivity, in the second layer, a reflectance of light increases as an absolute value of an incident angle with respect to a first layer side surface of the second layer decreases, and a transmittance of light increases as an absolute value of an incident angle with respect to a first layer side surface of the second layer increases.

Another embodiment of the present disclosure provides a diffusion member comprising a transmission type diffractive grating or a microlens array, and a dielectric multi-layer.

Another embodiment of the present disclosure provides a stacked body comprising: the diffusion member described above, a sealing material sheet placed on a first layer side surface of the diffusion member, and configured to seal an LED element, wherein the sealing material sheet includes a sealing material composition containing a thermoplastic resin.

Another embodiment of the present disclosure provides a stacked body comprising: the diffusion member described above, a sealing material sheet placed on a transmission type diffractive grating or a microlens array side surface of the diffusion member, and configured to seal an LED element, wherein the sealing material sheet includes a sealing material composition containing a thermoplastic resin.

Another embodiment of the present disclosure provides a diffusion member set comprising: a first member including a first layer, and a sealing material sheet configured to seal an LED element, and a second member including a second layer, and being used by placing on a first layer side surface of the first member via a void portion, wherein the first layer has a light transmissivity and a light diffusivity, in the second layer, a reflectance of light increases as an absolute value of an incident angle with respect to a first layer side surface of the second layer decreases, and a transmittance of light increases as an absolute value of an incident angle with respect to a first layer side surface of the second layer increases, and the sealing material sheet includes a sealing material composition containing a thermoplastic resin.

Another embodiment of the present disclosure provides an LED backlight comprising: an LED substrate including a plurality of LED elements placed on one surface side of a supporting substrate, and a diffusion member placed on the LED element side surface of the LED substrate, and including a first layer and a second layer in this order from the LED substrate side, wherein the first layer has a light transmissivity and a light diffusivity, in the second layer, a reflectance of light increases as an absolute value of an incident angle with respect to a first layer side surface of the second layer decreases, and a transmittance of light increases as an absolute value of an incident angle with respect to a first layer side surface of the second layer increases.

Another embodiment of the present disclosure provides an LED backlight comprising: an LED substrate including a plurality of LED elements placed on one surface side of a supporting substrate, and a diffusion member placed on the LED element side surface of the LED substrate, wherein the diffusion member includes a transmission type diffractive grating or a microlens array, and a dielectric multi-layer, in this order from the LED substrate side.

The present disclosure provides a displaying apparatus comprising: a display panel, and the LED backlight described above placed on a rear side of the display panel.

Advantageous Effects of Disclosure

The present disclosure has an effect that it is possible to provide a diffusion member, an LED backlight and a displaying apparatus capable of improving the in-plane uniformity of luminance, while reducing the thickness.

BRIEF DESCRIPTION OF DRAWINGS

FIG. 3 is a diagram explaining a diffusion angle.

FIGS. 4A and 4B are diagrams explaining a light diffusivity in the present disclosure.

FIG. 5 is a diagram explaining a light diffusivity in the present disclosure.

FIG. 21 is a schematic cross-sectional view illustrating an example of an LED backlight in the present disclosure.

FIGS. 22A and 22B are schematic cross-sectional views illustrating an example of an LED backlight in the present disclosure.

DESCRIPTION OF EMBODIMENTS

The diffusion member, LED backlight and displaying apparatus in the present disclosure are hereinafter explained. However, the present disclosure is enforceable in a variety of different aspects, and thus should not be taken as is limited to the contents described in the embodiments exemplified as below. Also, the drawings may show the features such as width, thickness, and shape of each member schematically comparing to the actual form in order to explain the present disclosure more clearly in some cases; however, it is merely an example, and thus does not limit the interpretation in the present disclosure. Also, in the present description and each drawing, for the factor same as that described in the figure already explained, the same reference sign is indicated and the detailed explanation thereof may be omitted.

In the present descriptions, in expressing an aspect wherein a certain member is placed on or below another member, when described as merely "on surface" or "on surface side", unless otherwise stated, it includes both of the following cases: a case wherein a certain member is placed directly on or directly below another member so as to be in contact with another member, and a case wherein a certain member is placed on the upper side or the lower side of another member via yet another member.

Also, in the present descriptions, "LED" means a light emitting diode.

Also, in the present descriptions, terms such as "sheet", "film", and "plate" are not distinguished from each other based only on differences in designations. For example, a "sheet" is used in the mean that it includes a member referred to as a film and a plate.

A. Diffusion Member

The diffusion member in the present disclosure may be classified into two embodiments. Hereinafter, each embodiment will be described.

I. First Embodiment of Diffusion Member

The first embodiment of the disclosed diffusion member in the present disclosure is a member comprising a first layer and a second layer, in this order, wherein the first layer has a light transmissivity and a light diffusivity, in the second layer, a reflectance of light increases as an absolute value of an incident angle with respect to a first layer side surface of the second layer decreases, and a transmittance of light increases as an absolute value of an incident angle with respect to a first layer side surface of the second layer increases. In used thereof, the diffusion member in the present disclosure uses the first layer side surface as a light incident surface.

Figure 1:
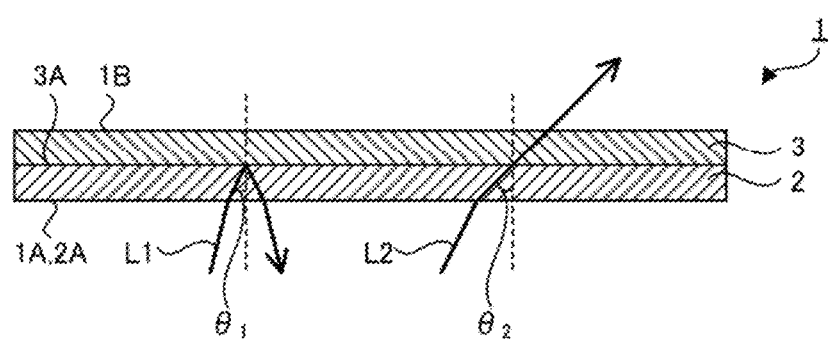
FIG. 1 is a schematic cross-sectional view illustrating an example of a diffusion member in the present disclosure.

The first embodiment of the diffusion member in the present disclosure will be explained with reference to drawings. FIG. 1 is a schematic cross-sectional view illustrating an example the first embodiment of the diffusion member in the present disclosure. As illustrated in FIG. 1, diffusion member 1 comprises first layer 2 and second layer 3 in this order. First layer 2 has light transmissivity and light diffusivity, and transmits and diffuses incident lights L1 and L2 from opposite surface 2A with respect to second layer 3 side surface of first layer 2. Also, in second layer 3, a reflectance of light increases as an absolute value of the incident angle with respect to first layer 2 side surface 3A of second layer 3 decreases, and a transmittance of light increases as an absolute value of the incident angle with respect to first layer 2 side surface 3A of second layer 3 increases. Therefore, in second layer 3, it is possible to reflect incident light L1 with low incident angle $\theta_1$ with respect to first layer 2 side surface 3A of second layer 3, and to transmit incident light L2 with high incident angle $\theta_2$ with respect to first layer 2 side surface 3A of second layer 3. Incidentally, the low incident angle refers to one whose absolute value of the incident angle is small, and the high incident angle refers to one whose absolute value of the incident angle is large.

Figure 2:
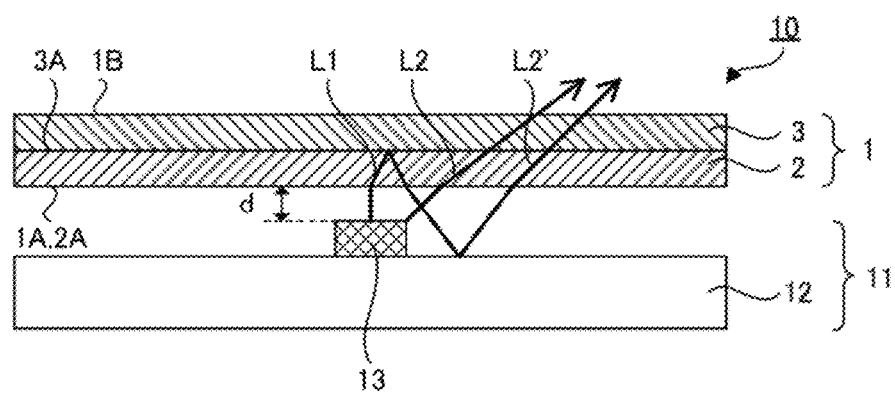
FIG. 2 is a schematic cross-sectional view illustrating an example of an LED backlight in the present disclosure.

FIG. 2 is a schematic cross-sectional view illustrating an example of a downlight type system LED backlight comprising a diffusion member of the first embodiment in the present disclosure, and it is an example comprising the diffusion member illustrated in FIG. 1. As illustrated in FIG. 2, LED backlight 10 comprises LED substrate 11 including LED element 13 placed on one surface of supporting substrate 12, and diffusion member 1 placed on LED element 13 side surface of LED substrate 11. Diffusion member 1 is placed so that first layer 2 side surface 1A faces LED substrate 11. Incidentally, in FIG. 2, LED substrate 11 and diffusion member 1 are placed apart.

In the present disclosure, it is possible to diffuse the incident light from first layer 2 side surface 1A of diffusion member 1 by first layer 2 as illustrated in FIG. 1, as well as to reflect incident light L1 with low incident angle $\theta_1$ with respect to first layer 2 side surface 3A of second layer 3, among the light transmitted and diffused through first layer 2, by first layer 2 side surface 3A of second layer 3, and to diffuse by entering into first layer 2 again as illustrated in FIG. 2. Also, among the light transmitted and diffused through first layer 2, incident light L2 and L2' with high incident angle $\theta_2$ with respect to first layer 2 side surface 3A of second layer 3 may be transmitted through second layer 3, and may be emitted from second layer 3 side surface 1B of diffusion member 1. Also, by combining the first layer and the second layer, incident light from the first layer side surface of the diffusion member, in particular, incident light with low incident angle from the first layer side surface of the diffusion member may be diffused by transmitting through the first layer many times, so that it may be emitted with high emit angle from the second layer side surface of the diffusion member. Therefore, when the diffusion member in the present disclosure is used for the downlight type system LED backlight, the light emitted from the LED element may be diffused to the entire light emitting surface, thereby improving the in-plane uniformity of luminance.

Also, in the present disclosure, as described above, by combining the first layer and the second layer, since the incident light with low incident angle from the first layer side surface of the diffusion member may be transmitted through the first layer many times, the optical route length from the point where the light enters from the first layer side surface of the diffusion member to the point where the light is emitted from the second layer side surface of the diffusion member, may be increased. This makes it possible to emit a part of the light, emitted from the LED element and then emitted from the second layer side surface of diffusion member, from a position away from the LED element in-plane direction, rather than directly above the LED element. Therefore, in the downlight type system LED backlight comprising the diffusion member in the present disclosure, even when the distance between the LED element and the diffusion member is shortened, luminance unevenness may be suppressed. Therefore, it is possible to improve the in-plane uniformity of luminance, while reducing the thickness. Also, luminance unevenness may be suppressed even when the number of the LED element is reduced. Therefore, it is possible to realize the uniformity of luminance, reduction of thickness, reduction of cost, and the reduction of power consumption at the same time.

Also, unlike the conventional transmission reflector, the diffusion member in the present disclosure may eliminate the need for alignment with the LED element. Therefore, by using the diffusion member in the present disclosure, the LED backlight may be easily produced.

Hereinafter, the first embodiment of the diffusion member in the present disclosure will be described in detail.

1. First Layer

The first layer in the present disclosure is a member placed on one surface side of the second layer described later, and has light transmissivity and light diffusivity.

As the light transmissivity of the first layer, for example, the overall transmittance of the first layer is preferably 50% or more, and among the above, is preferably 70% or more, and particularly preferably 90% or more. By the overall transmittance of the first layer being in the range described above, the luminance may be increased, when the diffusion member in the present disclosure is used for an LED backlight.

Incidentally, the overall transmittance of the first layer may be measured, for example, by a method according to JIS K7361-1: 1997. A CIE standard light source D65 may be used as the light source.

The light diffusivity of the first layer may be, for example, a light diffusivity that randomly diffuses light, and may be a light diffusivity that diffuses light mainly in a certain direction. The light diffusivity that diffuses light mainly in a certain direction is a property of deflecting light, that is, a property of changing the traveling direction of the light. Among the above, it is preferable that the light diffusivity of the first layer is a light diffusivity that diffuses light mainly in a certain direction. By deflecting the light in a predetermined direction, that is, by controlling the traveling direction of the light, it is possible to form the light into an arbitrary shape or arbitrary intensity distribution, so that the in-plane uniformity of luminance may further be improved.

As the light diffusivity of the first layer, when light diffusivity is a light diffusivity that randomly diffuses light, for example, the diffusion angle of the light entering the first layer may be 10° or more, may be 15° or more, and maybe 20° or more. Also, the diffusion angle of the light entering the first layer may be, for example, 85° or less, may be 60° or less, and may be 50° or less. By the diffusion angle being within the range described above, the in-plane uniformity of luminance may be improved, when the diffusion member in the present disclosure is used for an LED backlight.

Here, the diffusion angle will be described. FIG. 3 is a graph illustrating a transmitted light intensity distribution, and is a diagram explaining a diffusion angle. In the present descriptions, a half-width (FWHM) that is a difference between two angles those are ½ of maximum transmitted light intensity $I_{max}$ of the light perpendicularly entered to one surface of the first layer constituting the diffusion member and emitted from the other surface of the first layer, is defined as a diffusion angle $\alpha$.

Incidentally, the diffusion angle may be measured using a goniophotometer and a deflection angle spectrophotometric colorimeter. For measuring the diffusion angle, for example, a goniophotometer GP-200 from Murakami Color Research Laboratory may be used.

Also, as the light diffusivity of the first layer, when the light diffusivity is a light diffusivity that diffuses light mainly in a certain direction, the shape and the intensity distribution, for example, of the light transmitted through the first layer is not particularly limited. It is appropriately selected according to the light distribution property of a light source, the shape, and intensity distribution, for example, of the target light. Examples of the light diffusivity of the first layer may include a property of emitting light having a non-Gaussian intensity distribution, specifically, a property of emitting light having an annular intensity distribution, and a property of emitting light having a top hat shaped intensity distribution. FIGS. 4A and 4B are examples of the annular intensity distribution, and FIG. 5 is an example of a top hat shaped intensity distribution.

Among the above, it is preferable that the light diffusivity of the first layer is a property of emitting light having an annular intensity distribution. In particular, it is preferable that the light diffusivity of the first layer is a property of emitting light having an annular intensity distribution, and the intensity of the transmitted light emitted to an optical axis center is substantially zero, as illustrated in FIG. 4A, for example. The incident light from the first layer side surface of the diffusion member may be spread annularly by the first layer, as well as the incident light with low incident angle with respect to the first layer side surface of the second layer may be reflected by the first layer side surface of the second layer, and may enter the first layer again so as to be spread annularly. By repeating this, the incident light from the first layer side surface of the diffusion member may be spread laterally. Therefore, when the diffusion member in the present disclosure is used for a downlight type system LED backlight, the light emitted from the LED element may be diffused to the entire light emitting surface, so that the in-plane uniformity of luminance may further be improved as well as the need for alignment with the LED element may be eliminated.

Here, the intensity distribution may be measured using a goniophotometer and a deflection angle spectrophotometric colorimeter.

The first layer is not particularly limited as long as it has the light transmissivity and light diffusivity described above, and various configurations having the light transmissivity and light diffusivity described above may be employed. Examples of the first layer may include a transmission type diffractive grating, a microlens array, and a diffusing agent-containing resin film containing a diffusing agent, and a resin. Specifically, when the first layer has a light diffusivity that diffuses light mainly in a certain direction, examples thereof may include a transmission type diffractive grating, and microlens array. Meanwhile, when the first layer has a light diffusivity that randomly diffuses light, examples thereof may include a diffusing agent-containing resin film. Among them, the transmission type diffractive grating and the microlens array are preferable from the viewpoint of light diffusivity. Incidentally, the transmission type diffractive grating is also referred to as a transmission type diffractive optical element (DOE).

When the first layer is a transmission type diffractive grating, the transmission type diffractive grating is not particularly limited as long as it has light transmissivity and light diffusivity described above.

Figure 6:
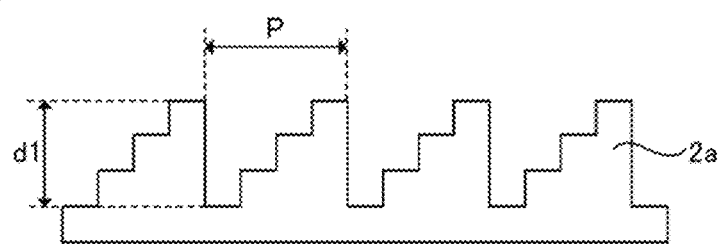
FIG. 6 is a schematic cross-sectional view illustrating a transmission type diffractive grating in the present disclosure.

The transmission type diffractive grating may be, for example, any one of a phase type diffractive grating and an amplitude type diffractive grating. Also, the phase type diffractive grating may be, for example, any one of a relief type diffractive grating and a volumetric type diffractive grating. Among them, the transmission type diffractive grating is preferably a relief type diffractive grating. Furthermore, when the transmission type diffractive grating is a relief type diffractive grating, a multilevel diffractive grating wherein the cross-sectional shape of the groove is a stair shape, is preferable among the above. Since the multilevel diffractive grating usually has a small diffractive grating pitch, the present disclosure capable of eliminating the need for aligning the diffusion member and the LED element, is particularly effective. The number of levels in the multilevel diffractive grating may be, for example, two, four, eight, and sixteen. FIG. 6 illustrates an example of multilevel diffractive grating 2a whose number of levels is four.

Also, examples of the transmission type diffractive grating may include a transmission type diffractive grating that transmits and diffracts light and emits light having a non-Gaussian intensity distribution, and specifically, may include a transmission type diffractive grating that transmits and diffracts light and emits light having an annular intensity distribution; and an transmission type diffractive grating that transmits and diffracts light and emits light having a top hat shaped intensity distribution. Among them, the transmission type diffractive grating is preferably a transmission type diffractive grating that transmits and diffracts light and emits light having an annular intensity distribution, that is, preferably a transmission type diffractive grating that transmits and diffracts light, and emits a transmission diffraction light with an annular intensity distribution wherein a transmission diffraction light intensity emitted to a surrounding part is stronger, compared to a transmission diffraction light intensity emitted to an optical axis center. Particularly, the transmission type diffractive grating is preferably a transmission type diffractive grating that emits transmission diffraction light having an annular intensity distribution, and the intensity of the transmission diffraction light emitted to an optical axis center is substantially zero, as illustrated in FIG. 4A, for example. For such a transmission type diffractive grating, when the diffusion member in the present disclosure is used for an LED backlight, the intensity of the light emitted to the optical axis center may be reduced, as well as the intensity of the light emitted to surrounding part may be increased, thereby further improving the in-plane uniformity of luminance.

For the transmission type diffractive grating that transmits and diffracts light and emits light having an annular intensity distribution, in the annular intensity distribution, an angle between a direction wherein the transmission diffraction light intensity is maximum, and a normal direction of the transmission type diffractive grating may be, for example, 30° or more and 75° or less. When the angle is too small, the effect of widening the light in the lateral direction may not be sufficiently obtained, so that it may be difficult to obtain uniform luminance. Also, when the angle is too large, a total reflection occurs, so that it may be difficult to obtain uniform luminance. The angle may be, for example, 30° or more and 45° or less. By the angle being within the above range, it is easy to produce the transmission type diffractive grating.

Here, the intensity distribution and the angle may be measured using a goniophotometer and a deflection angle spectrophotometric colorimeter. For measuring the angle, for example, a goniophotometer GP-200, and a deflection angle spectrophotometric colorimeter GCMS-11 from Murakami Color Research Laboratory may be used.

The pitch, for example, of the transmission type diffractive grating may be appropriately adjusted so as to obtain the light transmissivity and light diffusivity described above. Specifically, when the wavelength of the light output by the LED element is a single color such as red, green, and blue, the light from the LED element may be effectively bent by setting the pitch according to the respective wavelengths.

Specifically, the pitch of the transmission type diffractive grating may be 50 μm or more and 200 μm or less. As described above, since the diffusion member in the present disclosure may eliminate the need for alignment with LED element, it is particularly useful when the pitch of the transmission type diffractive grating is small as in the above range.

Also, when the transmission type diffractive grating is a relief type diffractive grating, the depth of the groove of the transmission type diffractive grating may be, for example, 1 μm or more and 5 μm or less.

Incidentally, for example, in a case of a multilevel diffractive grating, the pitch of the transmission type diffractive grating refers to distance "P" between the adjacent grooves, as illustrated in FIG. 6. Also, for example, in a case of a multilevel diffractive grating, the depth of the groove of the transmission type diffractive grating refers to maximum depth "dl" of the groove, as illustrated in FIG. 6.

Here, the pitch and the depth of the groove of the transmission type diffractive grating may be determined from a plane microscope photograph of the transmission type diffractive grating, or a cross-sectional microscope photograph, in the thickness direction, of the transmission type diffractive grating observed by a transmission electron microscopy (TEM), a scanning electron microscopy (SEM) or a scanning transmission electron microscopy (STEM).

As the material constituting the transmission type diffractive grating, any material may be used as long as a transmission type diffractive grating having the light transmissivity and light diffusivity described above may be obtained, and a material usually used for a transmission type diffractive grating may be used. Examples thereof may include glass such as quartz glass and resin.

Also, the method for forming a transmission type diffractive grating may be similar to the method for forming a common transmission type diffractive grating. When the transmission type diffractive grating is a multilevel diffractive grating, examples of a method for forming a transmission type diffractive grating may include a method of processing a glass substrate such as a quartz substrate by lithography using a direct drawing method with an electron beam or a laser, or lithography using a photomask, and a groove having a stair shape may be formed on the glass substrate by repeatedly performing a lithography process and an etching process. Also, other examples of a method for forming a transmission type diffractive grating may include a resin-shaping by a mold. In this case, for example, a groove having a stair shape may be formed in a resin layer by forming a resin layer on one surface of a substrate layer and shaping the resin layer by a mold; or a groove having a stair shape may be formed in a resin layer by forming a resin layer on one surface of the second layer and shaping the resin layer by a mold. Examples of a method for producing a mold may include the method described above wherein a molding die is prepared at first by a method of processing a glass substrate such as a quartz substrate by lithography using a direct drawing method with an electron beam or a laser, or lithography using a photomask; and then, a reverse mold is prepared using this molding die, and this reverse mold may be used as a mold. Also, as a method for designing a transmission type diffractive grating, for example, an iterative Fourier transform algorithm (IFTA) may be used.

When the first layer is a microlens array, the microlens array is not particularly limited as long as it has the light transmissivity and light diffusivity described above.

Also, examples of the microlens array may include an microlens array that transmits and refracts light and emits light having a non-Gaussian intensity distribution, and specifically, a microlens array that transmits and refracts light and emits light having an annular intensity distribution; and a microlens array that transmits and refracts light and emits light having a top hat shaped intensity distribution. Among them, the microlens is preferably a microlens array that transmits and refracts light and emits light having an annular intensity distribution, that is, preferably a microlens array that transmits and refracts light, and emits a transmission refraction light with an annular intensity distribution wherein a transmission refraction light intensity emitted to a surrounding part is stronger, compared to a transmission refraction light intensity emitted to an optical axis center. For such a microlens array, the intensity of the light emitted to the optical axis center may be reduced, as well as the intensity of the light emitted to surrounding part may be increased, thereby further improving the in-plane uniformity of luminance, when the diffusion member in the present disclosure is used for an LED backlight.

The shape, pitch, and size, for example, of the microlens may be appropriately adjusted as long as the light transmissivity and light diffusivity described above may be obtained.

Specifically, the pitch of the microlens of the microlens array may be 1 mm or less, and may be 0.6 mm or less. As described above, the diffusion member in the present disclosure is particularly effective when the pitch of the microlens is small as the range described above, since the need for alignment with the LED element may be eliminated. Also, the pitch of the microlens may be, for example, 0.001 mm or more.

Here, the pitch of the microlens may be determined from a plane microscope photograph of the microlens array or a cross-sectional microscope photograph in the thickness direction of the microlens array observed by a transmission electron microscope (TEM), a scanning electron microscope (SEM) or a scanning transmission electron microscope (STEM).

As a material constituting the microlens, any material may be used as long as a microlens having light transmissivity and light diffusivity described above may be obtained, and a material commonly used for a microlens may be employed. Also, the method for forming the microlens may be similar to a common method for forming the microlens.

When the first layer is a diffusing agent-containing resin film, the diffusing agent-containing resin film is not particularly limited as long as it has the light transmissivity and light diffusivity described above.

The diffusing agent contained in the diffusing agent-containing resin film is not particularly limited as long as the light from LED element may be diffused, and a diffusing agent used for a diffusion plate commonly used for an LED backlight may be used. The content of the diffusing agent in the diffusing agent-containing resin film is not particularly limited as long as the light from LED element may be diffused, and may be similar to the content of the diffusing agent in a diffusion plate commonly used for an LED backlight.

Also, the resin contained in the diffusing agent-containing resin film is not particularly limited as long as the diffusing agent may be dispersed, and a resin used in a diffusion plate commonly used for an LED backlight may be employed.

The first layer may have any structure capable of exhibiting light diffusivity; for example, the light diffusivity may be exhibited with the entire layer, and the light diffusivity may be exhibited with the surface thereof. Examples of a layer wherein the light diffusivity is exhibited with the surface thereof may include a relief type diffractive grating and a microlens array. Meanwhile, examples of a layer wherein the light diffusivity is exhibited with the entire layer may include a volume type diffractive grating and a diffusing agent-containing resin film.

Figure 7A:
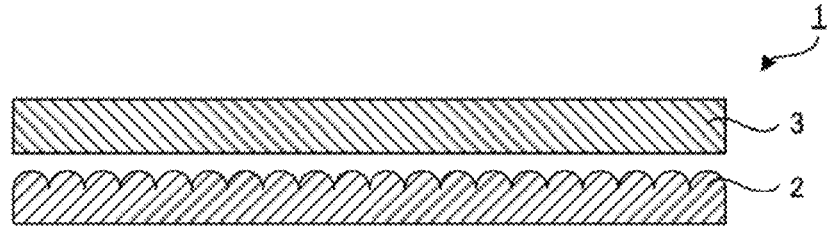
FIGS. 7A and 7B are schematic cross-sectional views illustrating an example of a diffusion member in the present disclosure.
Figure 7B:
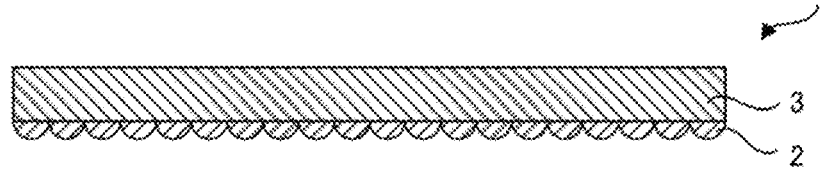

As the arrangement of the first layer and the second layer, for example, the first layer may be placed directly on one surface of the second layer; the first layer may be placed on one surface of the second layer via an adhesive layer or a pressure-sensitive adhesive layer; and first layer 2 may be placed on one surface of second layer 3 via a void portion as illustrated in FIG. 7A. For example, when the first layer is a layer wherein the light diffusivity is exhibited with the surface thereof, and the first layer has a structure capable of exhibiting the light diffusivity with the surface facing the second layer, it is preferable that the first layer and the second layer are placed via the void portion. Also, when the first layer is directly placed on one surface of the second layer, first layer 2 in a pattern form may be placed on one surface of second layer 3, for example, as illustrated in FIG. 7B. For example, when the first layer is a layer wherein the light diffusivity is exhibited with the surface thereof, the light diffusivity may be exhibited even when the first layer is placed in a pattern form.

When the first layer and the second layer are placed via the void portion, the first layer and the second layer may or may not be in contact. When the first layer and the second layer are not in contact, a spacer, for example, may be placed between the first layer and the second layer. Also, the void portion may be an air layer.

Examples of the method for stacking the first layer and the second layer may include a method wherein the first layer and the second layer are adhered via an adhesive layer or a pressure-sensitive adhesive layer; and a method wherein the first layer is directly formed on one surface of the second layer. Examples of a method for directly forming the first layer on one surface of the second layer may include a printing method, and a resin shaping by a mold. In the case of the printing method, and the resin shaping by a mold, the first layer may be directly formed in a pattern form on one surface of the second layer.

2. Second Layer

The second layer in the present disclosure is a member placed on one surface side of the first layer, and has an incident angle dependency in reflectance wherein a reflectance of light increases as an absolute value of an incident angle with respect to a first layer side surface of the second layer decreases; and an incident angle dependency in transmittance wherein a transmittance of light increases as an absolute value of an incident angle with respect to a first layer side surface of the second layer increases.

The second layer has an incident angle dependency in reflectance such that a reflectance of light increases as an absolute value of an incident angle with respect to a first layer side surface of the second layer decreases. That is, the reflectance of incident light with a low incident angle with respect to the first layer side surface of the second layer is larger than the reflectance of incident light with a high incident angle with respect to the first layer side surface of the second layer. Among the above, the reflectance of incident light with a low incident angle with respect to the first layer side surface of the second layer is preferably large.

Specifically, the regular reflectance of visible incident light to the first layer side surface of the second layer with an incident angle of ±60° or less is preferably 50% or more and less than 100%, more preferably 80% or more and less than 100%, and particularly preferably 90% or more and less than 100%. Incidentally, for all incident angles with the incident angle of ±60° or less, it is preferable that the regular reflectance of the visible light satisfies the range described above. When the regular reflectance is in the range described above, the in-plane uniformity of luminance may be improved, when the diffusion member in the present disclosure is used for an LED backlight.

The average value of the regular reflectance of visible incident light to the first layer side surface of the second layer with the incident angle of ±60° or less is preferably, for example, 80% or more and 99% or less, more preferably 90% or more and 97% or less. Incidentally, the average value of the regular reflectance refers to an average value of the regular reflectance of the visible light at the respective incident angles. By the average value of the regular reflectance being in the range described above, the in-plane uniformity of luminance may be improved, when the diffusion member in the present disclosure is used for an LED backlight.

Also, the regular reflectance of visible incident light to the first layer side surface of the second layer with an incident angle of 0° (perpendicularly incident) is preferably, for example, 80% or more and less than 100%, more preferably 90% or more and less than 100%, and particularly preferably 95% or more and less than 100%. By the regular reflectance being in the range described above, the in-plane uniformity of luminance may be improved, when the diffusion member in the present disclosure is used for an LED backlight.

Incidentally, in the present descriptions, "visible light" means light having a wavelength of 380 nm or more and 780 nm or less. Also, the regular reflectance may be measured using a goniophotometer and a deflection angle spectrophotometric colorimeter. For measuring the regular reflectance, for example, a goniophotometer GP-200, and a deflection angle spectrophotometric colorimeter GCMS-11 from Murakami Color Research Laboratory may be used.

Also, the overall transmittance of the incident light to the first layer side surface of the second layer with an incident angle of ±60° or less is preferably, for example, 10% or less, more preferably 5% or less, and particularly preferably 3% or less. Incidentally, for all incident angles with the incident angle of ±60° or less, it is preferable that the overall transmittance satisfies the range described above. By the overall transmittance being in the range described above, the regular reflectance may be in a predetermined range, so that the in-plane uniformity of luminance may be improved, when the diffusion member in the present disclosure is used for an LED backlight.

The second layer has an incident angle dependency in transmittance such that a transmittance of light increases as an absolute value of an incident angle with respect to a first layer side surface of the second layer increases. That is, the transmittance of the incident light with a high incident angle with respect to the first layer side surface of the second layer is larger than the transmittance of the incident light with a low incident angle to the first layer side surface of the second layer. Among the above, the transmittance of incident light with a high incident angle with respect to the first layer side surface of the second layer is preferably large. Specifically, the overall transmittance of the incident light with an incident angle of 70° or more and less than 90°, with respect to the first layer side surface of the second layer, is preferably 30% or more, more preferably 40% or more, and particularly preferably 50% or more. Incidentally, for all incident angles with the incident angle of 70° or more and less than 90°, it is preferable that the overall transmittance satisfies the range described above. Also, when the absolute value of the incident angle is 70° or more and less than 90°, it is preferable that the overall transmittance satisfies the range described above. By the overall transmittance being in the range described above, the in-plane uniformity of luminance may be improved, when the diffusion member in the present disclosure is used for an LED backlight.

The overall transmittance of the second layer may be measured by, for example, using a goniophotometer and a deflection angle spectrophotometric colorimeter by a method according to JIS K7361-1: 1997. For measuring the overall transmittance, for example, an ultraviolet-visible near-infrared spectrophotometer V-7200 from JASCO Corporation may be used. The CIE standard light source D65 may be used as a light source.

Also, the regular reflectance of visible incident light with an incident angle of 70° or more and less than 90°, with respect to the first layer side surface of the second layer, is preferably, for example, 70% or less, more preferably 60% or less, and particularly preferably 50% or less. Incidentally, for all incident angles with an incident angle of 70° or more and less than 90°, it is preferable that the regular reflectance of the visible light satisfies the range described above. Also, when the absolute value of the incident angle is 700 or more and less than 90°, it is preferable that the regular reflectance of the visible light satisfies the range described above. By the regular reflectance being in the range described above, the overall transmittance may be in a predetermined range, so that the in-plane uniformity of luminance may be improved, when the diffusion member in the present disclosure is used for an LED backlight.

Also, the average value of the regular reflectance of the visible incident light with an incident angle of 70° or more and less than 90°, with respect to the first layer side surface of the second layer, is preferably, for example, 70% or less, and more preferably 50% or less, and particularly preferably 30% or less. Incidentally, the average value of the regular reflectance refers to the average value of the regular reflectance of the visible light at the respective incident angles. By the average value of the regular reflectance being in the range described above, the overall transmittance may be in a predetermined range so that the in-plane uniformity of luminance may be improved, when the diffusion member in the present disclosure is used for an LED backlight.

The second layer is not particularly limited as long as it has the incident angle dependency in reflectance and transmittance described above, and various configurations having the incident angle dependency in reflectance and transmittance described above may be employed. Examples of the second layer may include a dielectric multi-layer; a reflective structure including a first reflective film in a pattern form and a second reflective film in a pattern form, in this order from the first layer side, wherein the opening of the first reflective film and the opening of the second reflective film are placed so as not to overlap in a plan view, and the first reflective film and the second reflective film are placed apart from each other in the thickness direction; and a reflection type diffractive grating.

A case wherein the second layer is a dielectric multi-layer, a reflective structure, or a reflection type diffractive grating is hereinafter explained.

(1) Dielectric Multi-Layer

When the second layer is a dielectric multi-layer, examples of the dielectric multi-layer may include a multi-layer film of an inorganic compound wherein inorganic layers having different refractive indices are alternately stacked; and a multi-layer film of a resin wherein resin layers having different refractive indices are alternately stacked.

<Multi-Layer Film of Inorganic Compound>

When the dielectric multi-layer is a multi-layer film of an inorganic compound wherein inorganic layers having different refractive indices are alternately stacked, the multi-layer film of an inorganic compound is not particularly limited as long as it has the incident angle dependency in reflectance and transmittance described above.

Among the inorganic layers having different refractive indices, the refractive index of the inorganic compound included in a high refractive index inorganic layer having a high refractive index may be, for example, 1.7 or more, and may be 1.7 or more and 2.5 or less. Examples of such inorganic compound may include one including titanium oxide, zirconium oxide, tantalum pentaoxide, niobium pentaoxide, lanthanum oxide, yttrium oxide, zinc oxide, zinc sulfide, or indium oxide as a main component, and including a small amount of titanium oxide, tin oxide, or cerium oxide.

Also, among the inorganic layers having different refractive indices, the refractive index of the inorganic compound included in a low refractive index inorganic layer having a low refractive index may be, for example, 1.6 or less, and may be 1.2 or more and 1.6 or less. Examples of such an inorganic compound may include silica, alumina, lanthanum fluoride, magnesium fluoride, and sodium aluminum hexafluoride.

The number of the stacked layers of the high refractive index inorganic layer and the low refractive index inorganic layer may be appropriately adjusted so as to obtain the incident angle dependency in reflectance and transmittance described above. Specifically, the total number of stacked layers of the high refractive index inorganic layer and the low refractive index inorganic layer may be four or more. Also, the upper limit of the total number of stacked layers is not particularly limited; and since the increase in the number of stacked layers increases the number of processing steps, it may be, for example, 24 or less.

As the thickness of the multi-layer film of the inorganic compound, it may be any thickness as long as the incident angle dependency in reflectance and transmittance described above may be obtained, and may be, for example, 0.5 µm or more and 10 µm or less.

Examples of a method for forming a multi-layer film of an inorganic compound may include a method wherein high refractive index inorganic layer and low refractive index inorganic layer are alternately stacked by, for example, a CVD method, a sputtering method, a vacuum deposition method, and a wet coating method.

<Multi-Layer Film of Resin>

When the dielectric multi-layer is a multi-layer film of a resin wherein resin layers having different refractive indices are alternately stacked, the multi-layer film of a resin is not particularly limited as long as it has the incident angle dependency in reflectance and transmittance described above.

Examples of the resin constituting the resin layer may include a thermoplastic resin and a thermosetting resin. Among them, a thermoplastic resin is preferable because of its good molding ability.

Various additives such as an antioxidant, an antistatic agent, a crystal nucleating agent, an inorganic particle, an organic particle, a viscosity reducing agent, a heat stabilizer, a lubricant, an infrared absorber, an ultraviolet absorber, and a doping agent for adjusting the refractive index may be added to the resin layer.

As the thermoplastic resin, for example, polyolefin resins such as polyethylene, polypropylene, polystyrene, and polymethylpentene; alicyclic polyolefin resins; polyamide resins such as nylon 6 and nylon 66; aramid resins; polyester resins such as polyethylene terephthalate, polybutylene terephthalate, polypropylene terephthalate, polybutyl succinate, and polyethylene-2,6-naphthalate; polycarbonate resin; polyarylate resin; polyacetal resin; polyphenylene sulfide resin; a fluororesin such as tetrafluoride ethylene resin, trifluoride ethylene resin, trifluorochloroethylene resin, tetrafluoroethylene-hexafluoropropylene copolymer, and a vinylidene fluoride resin; an acrylic resin; a methacrylic resin; a polyacetal resin; a polyglycolic acid resin; and a polylactic acid resin may be used. Among them, polyester is more preferable from the viewpoint of strength, heat resistance, and transparency.

In the present descriptions, a polyester refers to a homopolyester or a copolymer polyester which is a polycondensate of a dicarboxylic acid component skeleton and a diol component skeleton. Here, examples of the homopolyester may include polyethylene terephthalate, polypropylene terephthalate, polybutylene terephthalate, polyethylene-2,6-naphthalate, poly-1,4-cyclohexanedimethylene terephthalate, and polyethylene diphenylate. Among them, polyethylene terephthalate is preferable because of its low cost so that it may be used in a very wide variety of applications.

Also, in the present descriptions, a copolymer polyester is defined as a polycondensate including at least three or more components selected from a component having a dicarboxylic acid skeleton and a component having a diol skeleton described below. Examples of the component having a dicarboxylic acid skeleton may include terephthalic acid, isophthalic acid, phthalic acid, 1,4-naphthalenedicarboxylic acid, 1,5-naphthalenedicarboxylic acid, 2,6-naphthalenedicarboxylic acid, 4,4-diphenyldicarboxylic acid, 4,4-diphenylsulfondicarboxylic acid, adipic acid, sebacic acid, dimer acid, cyclohexanedicarboxylic acid and ester derivatives thereof. Examples of the component having a glycol skeleton may include ethylene glycol, 1,2-propanediol, 1,3-butanediol, 1,4-butanediol, 1,5-pentadiol, diethylene glycol, polyalkylene glycol, 2,2-bis(4-RB-hydroxyethoxyphenyl) propane, isosorbate, 1,4-cyclohexanedimethanol, and spiroglycol.

Among the resin layers having different refractive indices, the difference in in-plane average refractive index between the high refractive index resin layer having a high refractive index and the low refractive index resin layer having a low refractive index is preferably 0.03 or more, more preferably 0.05 or more, and still more preferably 0.1 or more. When the difference in the in-plane average refractive index is too small, a sufficient reflectance may not be obtained.

Also, the difference between the in-plane average refractive index and the thickness direction refractive index of the high refractive index resin layer is preferably 0.03 or more, and the difference between the in-plane average refractive index and the thickness direction refractive index of the low refractive index resin layer is preferably 0.03 or less. In this case, the reflectance of the reflectance peak is less likely to be decreased, even when the incident angle is increased.

As a preferable combination of a high refractive index resin used in the high refractive index resin layer and a low refractive index resin used in the low refractive index resin layer, firstly, the absolute value of the difference in the SP value of the high refractive index resin and the low refractive index resin is preferably 1.0 or less. When the absolute value of the difference in the SP value is in the range described above, delamination is less likely to occur. In this case, it is more preferable that the high refractive index resin and the low refractive index resin include the same base skeleton. Here, the base skeleton is a repeating unit constituting a resin. For example, when one of the resins is polyethylene terephthalate, ethylene terephthalate is a base skeleton. Also, for example, when one of the resins is polyethylene, ethylene is a base skeleton. When the high refractive index resin and the low refractive index resin are resins including the same base skeleton, delamination between layers is further less likely to occur.

As a preferable combination of a high refractive index resin used in the high refractive index resin layer and a low refractive index resin used in the low refractive index resin layer, secondly, it is preferable that the difference in the glass transition temperature of the high refractive index resin and the low refractive index resin is 20° C. or less. When the difference in the glass transition temperature is too large, thickness uniformity may become poor when a stacked film of a high refractive index resin layer and a low refractive index resin layer is formed. Also, when the stacked film is formed, overstretching may occur in some cases.

Further, it is preferable that the high refractive index resin is polyethylene terephthalate or polyethylene naphthalate, and the low refractive index resin is a polyester including spiroglycol. Here, the polyester including spiroglycol refers to a copolyester obtained by copolymerizing spiroglycol, or a homopolyester, or a polyester obtained by blending them. Since the difference in glass transition temperature between the polyester including spiroglycol, and polyethylene terephthalate or polyethylene naphthalate is small, it is preferable that the overstretching in production thereof is less likely to occur, as well as the delamination is less likely to occur. More preferably, it is preferable that the high refractive index resin is polyethylene terephthalate or polyethylene naphthalate, and the low refractive index resin is a polyester including spiroglycol and cyclohexanedicarboxylic acid. When the low refractive index resin is a polyester including spiroglycol and cyclohexanedicarboxylic acid, the difference in in-plane refractive index with polyethylene terephthalate or polyethylene naphthalate is large, so that a high reflectance is easily obtained. Further, since the difference in glass transition temperature with polyethylene terephthalate or polyethylene naphthalate is small, and the adhesive property is also excellent, the overstretching in production thereof is less likely to occur, as well as the delamination is less likely to occur.

Further, it is also preferable that the high refractive index resin is polyethylene terephthalate or polyethylene naphthalate, and the low refractive index resin is a polyester including cyclohexanedimethanol. Here, the polyester including cyclohexanedimethanol refers to a copolyester obtained by copolymerizing cyclohexanedimethanol, or a homopolyester, or a polyester obtained by blending them. Since the difference in glass transition temperature between the polyester including cyclohexanedimethanol and polyethylene terephthalate or polyethylene naphthalate is small, it is preferable that the overstretching in production thereof is less likely to occur, as well as the delamination is less likely to occur. In this case, the low refractive index resin is more preferably an ethylene terephthalate polycondensate wherein a copolymerization amount of cyclohexanedimethanol is 15 mol % or more and 60 mol % or less. Thereby, a change in optical property due to heating or time is particularly small, while having a high reflectance, so that the delamination is less likely to occur. An ethylene terephthalate polycondensate wherein the copolymerization amount of cyclohexanedimethanol is in the range described above is very strongly adhered to polyethylene terephthalate. Also, since the cyclohexanedimethanol group has a cis form or a trans form as a geometric isomer, and also has a chair type or a boat type as a conformer, an orientation crystallization is less likely to occur even when it is co-stretched with polyethylene terephthalate; has a high reflectance; a change in optical property due to a thermal history is further small; and a breakage during film formation is less likely to occur.

In the multi-layer film of a resin described above, a portion having a structure wherein a high refractive index resin layer and a low refractive index resin layer are alternately stacked in the thickness direction, may exist. That is, it is preferable that the arrangement order of the high refractive index resin layer and the low refractive index resin layer in the thickness direction is not a random state, and the arrangement order of the resin layers other than the high refractive index resin layer and the low refractive index resin layer is not particularly limited. Also, when the multi-layered film of the resin has a high refractive index resin layer, a low refractive index resin layer, and the other resin layer, as for the arrangement order thereof, it is more preferable that the layers are stacked in a regular sequence such as A(BCA)n, A(BCBA)n, and A(BABCBA)n, when the high refractive index resin layer is regarded as "A", the low refractive index resin layer is regarded as "B", and the other resin layer is regarded as "C". Here, "n" is the number of units of repetition, and when n=3 in A(BCA)n, for example, it represents one stacked in the order of ABCAB-CABCA in the thickness direction.

Also, the stacked number of the high refractive index resin layer and the low refractive index resin layer may be appropriately adjusted so as to obtain the incident angle dependency in reflectance and transmittance described above. Specifically, 30 or more respective layers of the high refractive index resin layer and the low refractive index resin layer may be stacked alternately, and 200 or more respective layers may be stacked. The total number of stacked layers of the high refractive index resin layer and the low refractive index resin layer may be, for example, 600 layers or more. When the number of stacked layers is too small, a sufficient reflectance may not be obtained. Also, by the number of stacked layers being in the range described above, a desired reflectance may be easily obtained. Also, the upper limit of the total number of stacked layers is not particularly limited, and may be, for example, 1500 layers or less, in consideration of the increase in size of the device and the decrease in stacking accuracy due to an excessively large number of layers.

Further, it is preferable that the multi-layer film of a resin includes a surface layer including polyethylene terephthalate or polyethylene naphthalate having a thickness of 3 μm or more, on at least one surface, and among the above, it is preferable to include the surface layer on both surfaces. Also, the thickness of the surface layer is more preferably 5 μm or more. By including the surface layer, it is possible to protect the surface of the multi-layer film of a resin.

Examples of a method for producing a multi-layer film of a resin may include a co-extrusion method. Specifically, reference may be made to a method for producing a stacked films described in Japanese Patent Application Laid-Open (JP-A) No. 2008-200861.

Further, as the multi-layer film of a resin, a commercially available stacked film may be used, and specific examples thereof may include Picassas (registered trademark) from Toray Industries, Ltd., and ESR from 3M Co., Ltd.

(2) Reflective Structure

The reflective structure includes a first reflective film in a pattern form and a second reflective film in a pattern form, in this order from the first layer side, wherein the opening of the first reflective film and the opening of the second reflective film are placed so as not to overlap in a plan view, and the first reflective film and the second reflective film are placed apart from each other in the thickness direction.

The reflective structure may be classified into two aspects. The first aspect of the reflective structure includes a transparent substrate, a first reflective film in a pattern form placed on one surface of the transparent substrate, and a second reflective film in a pattern form placed on the other surface of the transparent substrate, wherein the opening of the first reflective film and the opening of the second reflective film are placed so as not to overlap in a plan view, and the first reflective film and the second reflective film are placed apart from each other in the thickness direction. Also, the second aspect of the reflective structure includes a transparent substrate; a convex portion in a pattern form placed on one surface of the transparent substrate and having a light transmissivity; a first reflective film in a pattern form placed on the opposite surface side with respect to the transparent substrate side surface of the convex portion; and a second reflective film in a pattern form placed on the opening of the convex portion on one surface of the transparent substrate, wherein the opening of the first reflective film and the opening of the second reflective film are placed so as not to overlap in a plan view, and the first reflective film and the second reflective film are placed apart from each other in the thickness direction. Hereinafter, each aspect will be described separately.

<First Aspect of Reflective Structure>

The first aspect of the reflective structure in the present disclosure includes a transparent substrate, a first reflective film in a pattern form placed on one surface of the transparent substrate, and a second reflective film in a pattern form placed on the other surface of the transparent substrate, wherein the opening of the first reflective film and the opening of the second reflective film are placed so as not to overlap in a plan view, and the first reflective film and the second reflective film are placed apart from each other in the thickness direction. In the case of the reflective structure in the present aspect, in the diffusion member in the present disclosure, the first layer is placed on the first reflective film side surface of the reflective structure.

Figure 8A:
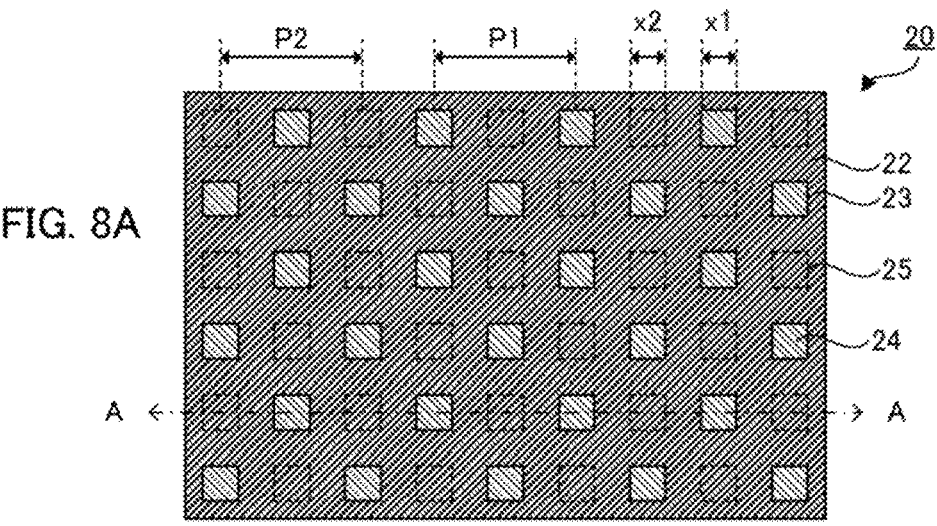
FIGS. 8A to 8C are a schematic plan view and schematic cross-sectional views illustrating an example of a reflective structure in the present disclosure.
Figure 8B:
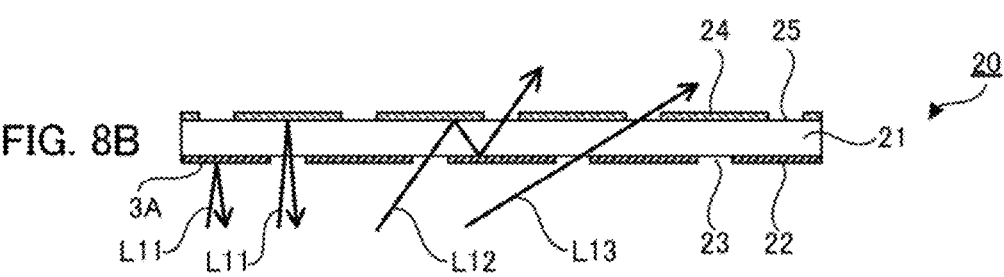

FIGS. 8A and 8B are a schematic plan view and a schematic cross-sectional view illustrating an example of a reflective structure in the present aspect, FIG. 8A is a plan view viewed from the first reflective film side surface of the reflective structure, and FIG. 8B is a line A-A cross-sectional view of FIG. 8A. As illustrated in FIGS. 8A and 8B, reflective structure 20 includes transparent substrate 21, first reflective film 22 in a pattern form placed on one surface of transparent substrate 21, and second reflective film 24 placed on the other surface of transparent substrate 21, wherein opening 23 of first reflective film 22 and opening 25 of second reflective film 24 are placed so as not to overlap in a plan view. Also, first reflective film 22 and second reflective film 24 are placed on each surface of transparent substrate 21, and placed apart from each other in the thickness direction. Incidentally, in FIG. 8A, the opening of the second reflective film is indicated by a broken line. Further, FIG. 8C is a schematic cross-sectional view illustrating an example of the LED backlight including the diffusion member including the reflective structure in the present embodiment.

Figure 8C:
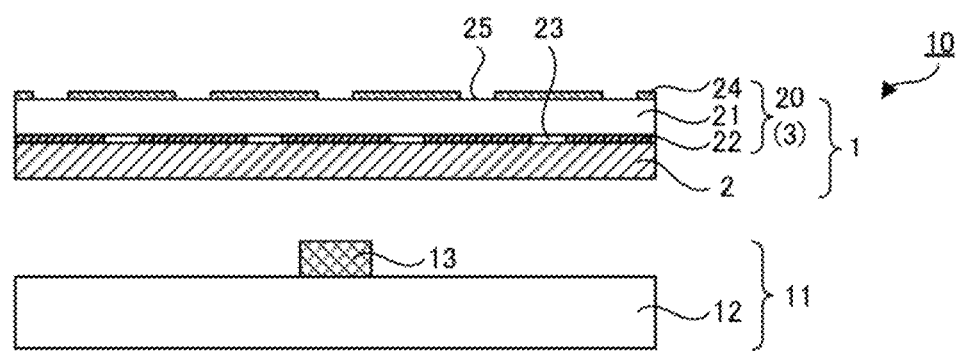

In such a reflective structure, the first reflective film and the second reflective film in a pattern form are stacked, and since the opening of the first reflective film and the opening of the second reflective film are placed so as not to overlap in a plan view, when the diffusion member including the reflective structure in the present aspect is used for an LED backlight, as illustrated in FIG. 8C, for example, at least one of first reflective film 22 and second reflective film 24 will always be present at directly above LED element 13. Therefore, as illustrated in FIG. 8B, for example, it is possible to reflect incident light L11 with low incident angle with respect to first reflective film 22 side surface of reflective structure 20, that is, surface 3A of the side wherein the first layer (not shown in the figure) of reflective structure 20 (second layer) is placed, by first reflective film 22 and second reflective film 24. Further, since the opening of the first reflective film and the opening of the second reflective film are placed so as not to overlap in a plan view, and since the first reflective film and the second reflective film are placed apart from each other in the thickness direction, it is possible to emit incident light L12, L13 with high incident angle with respect to first reflective film 22 side surface of reflective structure 20, that is, surface 3A of the side wherein the first layer (not shown in the figure) of reflective structure 20 (second layer) is placed, from opening 23 of first reflective film 22 and opening 25 of second reflective film 24. Thereby, a part of the light emitted from the LED element, and then, emitted from the second layer side surface of the diffusion member may be emitted from a position away from the LED element in-plane direction, rather than directly above the LED element. Therefore, in-plane uniformity of luminance may be improved.

Hereinafter, the reflective structure in the present aspect will be described.

As the first reflective film and the second reflective film, a common reflective film may be used, and for example, a metal film, and a dielectric multi-layer may be used. As a material of the metal film, a metal material used for a common reflective film may be employed, and examples thereof may include aluminum, gold, silver, and alloys thereof. Also, as the dielectric multi-layer, a film used for a common reflective film may be employed, and examples thereof may include a multi-layer film of an inorganic compound such as a multi-layer film wherein zirconium oxide and silicon oxide are alternately stacked. The materials included in the first reflective film and the second reflective film may be the same, and may be different from each other.

The pitch of the opening of the first reflective film and the second reflective film may be such that the incident angle dependency in reflectance and transmittance described above is obtained, and is appropriately set according to, for example, the light distribution property, size, pitch and shape of the LED element in the LED backlight wherein the diffusion member in the present disclosure is used, and the distance between the LED substrate and the diffusion member. The pitch of the opening of the first reflective film and the second reflective film may be the same, and may be different from each other.

The pitch of the opening of the first reflective film may be larger than the size of the LED element, for example. Specifically, the pitch of the opening of the first reflective film may be 0.1 mm or more and 20 mm or less.

Also, the pitch of the opening of the second reflective film is not particularly limited as long as it may suppress luminance unevenness, and among the above, it is preferable that the pitch is equal to or smaller than the pitch of the opening of the first reflective film, and it is preferable that the pitch is smaller than the pitch of the opening of the first reflective film. Specifically, the pitch of the opening of the second reflective film may be 0.1 mm or more and 2 mm or less. By making the pitch of the opening of the second reflective film as fine as described above, the pattern of the second reflective film portion and the opening portion of the second reflective film may be made difficult to visually recognize, so that a surface emission without unevenness is possible.

Incidentally, the pitch of the opening of the first reflective film refers to distance "P1" between the centers of adjacent openings 23 of first reflective film 22 as illustrated in FIG. 8A, for example. Further, the pitch of the opening of the second reflective film refers to distance "P2" between the centers of adjacent openings 25 of second reflective film 24 as illustrated in FIG. 8A, for example.

The size of the opening of the first reflective film and the second reflective film may be such that the incident angle dependency in reflectance and transmittance described above is obtained, and is appropriately set according to, for example, the light distribution property, size, pitch and shape of the LED element in the LED backlight wherein the diffusion member in the present disclosure is used, and the distance between the LED substrate and the diffusion member. The size of the opening of the first reflective film and the second reflective film may be the same, and may be different from each other.

As the size of the opening of the first reflective film, specifically, when the shape of the opening of the first reflective film is a rectangular shape, the length of the opening of the first reflective film may be 0.1 mm or more and 5 mm or less.

Also, the size of the opening of the second reflective film is not particularly limited as long as it may suppress luminance unevenness, and among the above, it is preferable that the size is equal to or smaller than the size of the opening of the first reflective film, and it is preferable that the size is smaller than the size of the opening of the first reflective film. Specifically, when the shape of the opening of the second reflective film is a rectangular shape, the length of the opening of the second reflective film may be 0.05 mm or more and 2 mm or less. By making the size of the opening of the second reflective film as fine as described above, the pattern of the second reflective film portion and the opening portion of the second reflective film may be made difficult to visually recognize, so that a surface emission without unevenness is possible.

Incidentally, when the shape of the opening of the first reflective film is a rectangular shape, the size of the opening of the first reflective film refers to, for example, length "x1" of opening 23 of first reflective film 22 as illustrated in FIG. 8A. Also, the size of the opening of the second reflective film refers to, for example, length "x2" of opening 25 of second reflective film 24 as illustrated in FIG. 8A.

The opening of the first reflective film and the second reflective film may have any shape, such as a rectangular shape, and a circular shape.

The thicknesses of the first reflective film and the second reflective film may be appropriately adjusted such that the incident angle dependency in reflectance and transmittance described above may be obtained. Specifically, the thickness of the first reflective film and the second reflective film may be 0.05 μm or more and 100 μm or less.

The first reflective film and the second reflective film may be formed on the surface of the transparent substrate, and may be a sheet shaped reflective film. A method for forming the first reflective film and the second reflective film is not particularly limited as long as a reflective film in a pattern form may be formed on the surface of the transparent substrate, and examples thereof may include a sputtering method, and a vacuum deposition method. Also, when the first reflective film and the second reflective film are sheet shaped reflective films, examples of a method for forming an opening may include a method wherein a plurality of through holes are formed by, for example, a punching process. In this case, as a method for stacking the transparent substrate and the sheet shaped reflective film, for example, a method wherein a sheet shaped reflective film is adhered to a transparent substrate via an adhesive layer or a pressure-sensitive adhesive layer, may be used.

The transparent substrate in the reflective structure in the present aspect is a member configured to support, for example, the first reflective film, and the second reflective film, and is a member configured to place the first reflective film and the second reflective film apart from each other in the thickness direction.

The transparent substrate has light transmissivity. As the light transmissivity of the transparent substrate, for example, the overall transmittance of the transparent substrate is preferably 80% or more, and among the above, is preferably 90% or more. Incidentally, the overall transmittance of the transparent substrate may be measured, for example, by a method according to JIS K7361-1: 1997. A CIE standard light source D65 may be used as the light source.

As a material constituting the transparent substrate, any material having the overall transmittance described above may be used, and examples thereof may include resins such as polyethylene terephthalate, polycarbonate, acrylic, cycloolefin, polyester, polystyrene, and acrylic styrene; and glasses such as quartz glass, Pyrex®, and synthetic quartz.

As illustrated in FIG. 8B for example, the thickness of the transparent substrate is preferably a thickness such that incident light L12 with high incident angle with respect to first reflective film 22 side surface of reflective structure 20, that is, surface 3A of the side wherein the first layer (not shown in the figure) of reflective structure 20 (second layer) is placed, may be emitted from opening 23 of first reflective film 22 and opening 25 of second reflective film 24. The thickness is appropriately set according to, for example, the pitch and the size of the opening of the first reflective film and the second reflective film, and the thickness of the first reflective film and the second reflective film. Specifically, the thickness of the transparent substrate may be 0.05 mm or more and 2 mm or less, and among them, is preferably 0.1 mm or more and 0.5 mm or less.

<Second Aspect of Reflective Structure>

The second aspect of the reflective structure in the present disclosure includes a transparent substrate; a convex portion in a pattern form placed on one surface of the transparent substrate and having a light transmissivity; a first reflective film in a pattern form placed on the opposite surface side with respect to the transparent substrate side surface of the convex portion; and a second reflective film in a pattern form placed on the opening of the convex portion on one surface of the transparent substrate, wherein the opening of the first reflective film and the opening of the second reflective film are placed so as not to overlap in a plan view, and the first reflective film and the second reflective film are placed apart from each other in the thickness direction. In the case of the reflective structure in the present aspect, in the diffusion member in the present disclosure, the first layer is placed on the first reflective film side surface of the reflective structure.

Figure 9A:
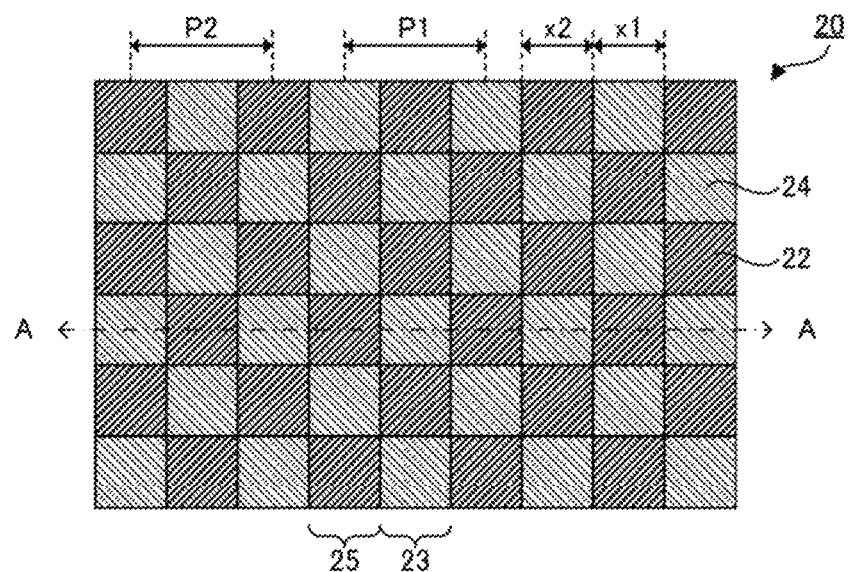
FIGS. 9A and 9B are a schematic plan view and a schematic cross-sectional view illustrating an example of a reflective structure in the present disclosure.
Figure 9B:
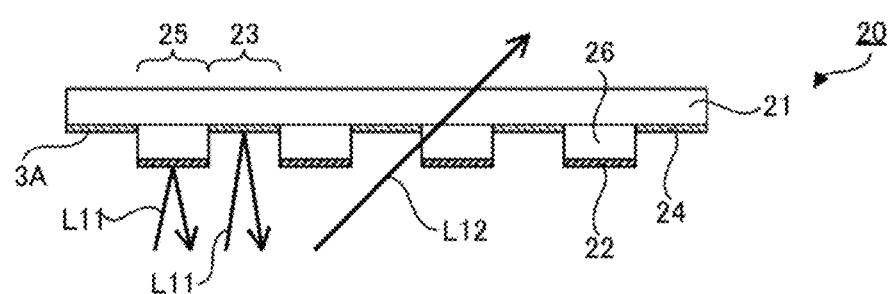

FIGS. 9A and 9B are a schematic plan view and a schematic cross-sectional view illustrating an example of the second aspect of the reflective structure in the present disclosure, FIG. 9A is a plan view viewed from the first reflective film side surface of the reflective structure, and FIG. 9B is a line A-A cross-sectional view of FIG. 9A. As illustrated in FIGS. 9A and 9B, reflective structure 20 includes transparent substrate 21; convex portion 26 in a pattern form placed on one surface of transparent substrate 21 and having a light transmissivity; first reflective film 22 in a pattern form placed on the opposite surface with respect to transparent substrate 21 side surface of convex portion 26; and second reflective film 24 in a pattern form placed on the opening of convex portion 26 on one surface of transparent substrate 21. Opening 23 of first reflective film 22 and opening 25 of second reflective film 24 are placed so as not to overlap in a plan view. Also, first reflective film 22 and second reflective film 24 are separated by convex portion 26, and are placed apart from each other in the thickness direction.

In such a reflective structure, the first reflective film and the second reflective film in a pattern form are stacked, and since the opening of the first reflective film and the opening of the second reflective film are placed so as not to overlap in a plan view, when the diffusion member including the reflective structure in the present aspect is used for an LED backlight, at least one of the first reflective film and the second reflective film will be always present at directly above the LED element. Therefore, similar to the first aspect, as illustrated in FIG. 9B for example, it is possible to reflect incident light L11 with low incident angle with respect to first reflective film 22 side surface of reflective structure 20, that is, surface 3A of the side wherein the first layer (not shown in the figure) of reflective structure 20 (second layer) is placed, by first reflective film 22 and second reflective film 24. Further, since the opening of the first reflective film and the opening of the second reflective film are placed so as not to overlap in a plan view, and since the first reflective film and the second reflective film are placed apart from each other in the thickness direction, it is possible to emit incident light L12 with high incident angle with respect to first reflective film 22 side surface of reflective structure 20, that is, surface 3A of the side wherein the first layer (not shown in the figure) of reflective structure 20 (second layer) is placed, from side surface of convex portion 26 and opening 25 of second reflective film 24. Thereby, a part of the light emitted from the LED element, and then, emitted from the second layer side surface of the diffusion member may be emitted from a position away from the LED element in-plane direction, rather than directly above the LED element. Therefore, in-plane uniformity of luminance may be improved.

Also, in this aspect, since the convex portion is provided, a self-alignment of the openings of the first reflective film and the second reflective film is possible, and the production cost may be reduced.

Incidentally, the materials of the first reflective film and the second reflective film; the pitch of the opening of the first reflective film and the second reflective film; the sizes of the opening of the first reflective film and the second reflective film; the shape of the opening of the first reflective film and the second reflective film; the thickness of the first reflective film and the second reflective film; and the method for forming the first reflective film and the second reflective film, may be similar to the first aspect.

Also, the transparent substrate may be similar to the first aspect described above.

The convex portion in the reflective structure in the present aspect is a member configured to place the first reflective film and the second reflective film apart from each other in the thickness direction.

The convex portion has a light transmissivity. As the light transmissivity of the convex portion, the overall transmittance of the convex portion is preferably, for example, 80% or more, and among them, preferably 90% or more. The overall transmittance of the convex portion may be measured, for example, by a method according to JIS K7361-1: 1997. A CIE standard light source D65 may be used as the light source.

As a material constituting the convex portion, any material wherein a convex portion in a pattern form may be formed, and having the overall transmittance described above may be used, and examples thereof may include a thermosetting resin and an electron beam curable resin.

As illustrated in FIG. 9B for example, the height of the convex portion is preferably a height such that it is possible to emit incident light L12 with high incident angle with respect to first reflective film 22 side surface of reflective structure 20, that is, surface 3A of the side wherein the first layer (not shown in the figure) of reflective structure 20 (second layer) is placed, from side surface of convex portion 26 and opening 25 of second reflective film 24; and it is appropriately set according to the pitch and size of the opening of the first reflective film and the second reflective film, and the thickness of the first reflective film and the second reflective film. Specifically, the height of the convex portion may be 0.05 mm or more and 2 mm or less, and among the above, preferably 0.1 mm or more and 0.5 mm or less.

The pitch, the size, and the plan view shape of the convex portion may be similar to the pitch, the size, and the shape of the opening of the second reflective film.

Figure 10A:
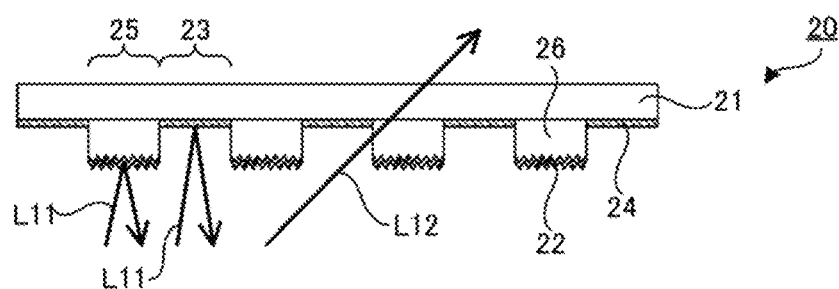
FIGS. 10A and 10B are schematic cross-sectional views illustrating an example of a reflective structure in the present disclosure.

The surface of the convex portion may be a smooth surface as illustrated in FIG. 9B for example, and may be a rough surface as illustrated in FIG. 10A. When the surface of the convex portion is a rough surface, it is possible to impart light diffusivity to the convex portion.

Figure 10B:
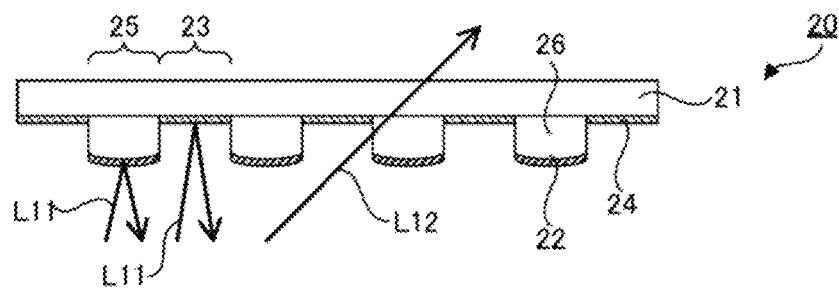

Also, the shape of the surface of the convex portion may be, for example, a flat surface as illustrated in FIG. 9B, and may be a curved surface as illustrated in FIG. 10B. When the surface of the convex portion is curved, it is possible to impart light diffusivity to the convex portion.

The method for forming the convex portion is not particularly limited as long as it is a method capable of forming a convex portion in a pattern form, and examples thereof may include a printing method, and a resin shaping by a mold.

(3) Reflection Type Diffractive Grating

When the second layer is a reflection type diffractive grating, the reflection type diffractive grating is not particularly limited as long as it has an incident angle dependency in reflectance and transmittance described above.

The pitch, for example, of the reflection type diffractive grating may be appropriately adjusted so as to obtain the incident angle dependency in reflectance and transmittance described above. Specifically, when the wavelength of the light output by the LED element is a single color such as red, green, and blue, the light from the LED element may be effectively reflected by setting the pitch according to the respective wavelengths.

As the material constituting the reflection type diffractive grating, any material capable of obtaining a reflection type diffractive grating having the incident angle dependency in reflectance and transmittance described above, may be used, and a material commonly used for the reflection type diffractive grating may be employed. A method for forming a reflection type diffractive grating may be similar to a method for forming a common reflection type diffractive grating.

3. Diffusion Member

In the present embodiment, the thickness of the diffusion member as a whole may be, for example, 30 µm or more and 200 µm or less.

4. Wavelength Conversion Member

Figure 11A:
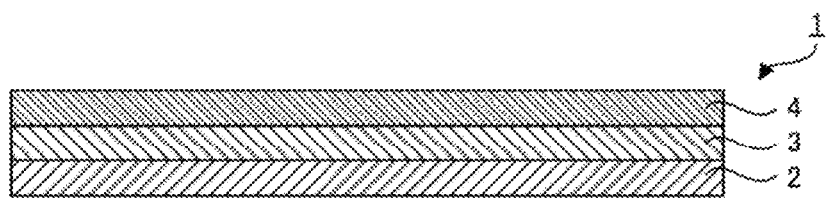
FIGS. 11A and 11B are schematic cross-sectional views illustrating an example of a diffusion member in the present disclosure.
Figure 11B:
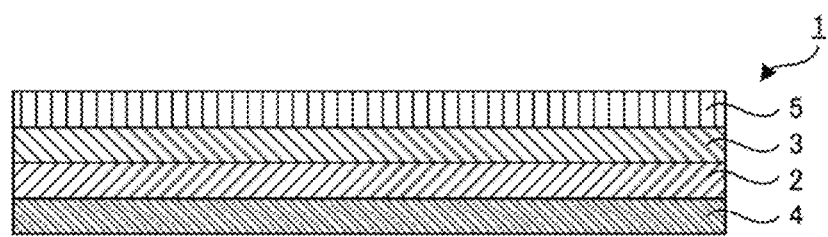

In the diffusion member in the present disclosure, for example, as illustrated in FIG. 11A, wavelength conversion member 4 may be placed on opposite surface side with respect to first layer 2 side surface of second layer 3, and as illustrated in FIG. 11B, wavelength conversion member 4 may be placed on opposite surface side with respect to second layer 3 side surface of first layer 2. In an LED backlight, a wavelength conversion member is used in some cases for a wide color gamut, for example, and when the diffusion member in the present disclosure is used for an LED backlight, a wavelength conversion member may be combined with the diffusion member.

The wavelength conversion member is a member that includes a fluorescent substance that absorbs light emitted from an LED element and emits excitation light. The wavelength conversion member has a function of generating white light by being combined with an LED substrate.

The wavelength conversion member usually includes at least a wavelength conversion layer including a fluorescent substance and a resin. The wavelength conversion member may be, for example, a wavelength conversion layer alone, and may be a stacked body including a wavelength conversion layer on one surface side of a transparent substrate. Among them, a wavelength conversion layer alone is preferable from the viewpoint of the reduction of the thickness. More preferably, a sheet shaped wavelength conversion member is used.

The fluorescent substance may be appropriately selected according to the emission color from the LED element; examples thereof may include a blue fluorescent substance, a green fluorescent substance, a red fluorescent substance, and a yellow fluorescent substance. For example, when the LED element is a blue LED element, a green fluorescent substance and a red fluorescent substance may be used as the fluorescent substance, and a yellow fluorescent substance may be used. Also, for example, when the LED element is an ultraviolet LED element, a red fluorescent substance, a green fluorescent substance, and a blue fluorescent substance may be used as the fluorescent substance.

A fluorescent substance commonly used for a wavelength conversion member of an LED backlight may be employed as the fluorescent substance. The quantum dots may also be used as the fluorescent substance.

The content of the fluorescent substance in the wavelength conversion member layer is not particularly limited as long as it may generate a desired white light when the diffusion member in the present disclosure is used for an LED backlight, and may be similar to the content of the fluorescent substance in a common wavelength conversion member in an LED backlight.

Further, the resin included in the wavelength conversion member is not particularly limited as long as the fluorescent substance may be dispersed. The resin may be similar to a resin used for a common wavelength conversion member in a LED backlight, and examples thereof may include a thermosetting resin such as a silicone based resin and an epoxy based resin.

The thickness of the wavelength conversion member is not particularly limited as long as the thickness may generate desired white light when the diffusion member in the present disclosure is used for an LED backlight, and may be, for example, 10 µm or more and 1000 µm or less.

Examples of the method for stacking a wavelength conversion member on the first layer or the second layer may include a method wherein the wavelength conversion member is adhered to the first layer or the second layer via an adhesive layer or a pressure-sensitive adhesive layer; and a method wherein a wavelength conversion member is formed directly on the surface of the first layer or the second layer. Examples of a method for directly forming a wavelength conversion member on the surface of the first layer or the second layer may include a printing method.

5. Optical Member

In the diffusion member in the present disclosure, for example, as illustrated in FIG. 11B, optical member 5 may further be placed on opposite surface side with respect to first layer 2 side surface of second layer 3. In an LED backlight, an optical member is used in addition to the diffusion member in some cases, and when the diffusion member in the present disclosure is used for an LED backlight, the optical member may be combined with the diffusion member. Examples of the optical member may include a prism sheet, and a reflective polarizing sheet.

(1) Prism Sheet

The prism sheet in the present disclosure has a function of collecting the incident light and intensively improving the luminance in the front direction. The prism sheet, for example, is one wherein a prism pattern including an acrylic resin, for example, is placed on one surface side of a transparent resin substrate.

As the prism sheet, for example, a BEF series luminance improving film from 3M Corporation may be used.

(2) Reflective Polarizing Sheet

The reflective polarizing sheet in the present disclosure has a function of transmitting only the first linearly polarized light component (such as P-polarized light) and reflecting, without absorbing, the second linearly polarized light component (such as S-polarized light) orthogonal to the first linearly polarized light component. The second linearly polarized light component reflected by the reflective polarizing sheet is reflected again, and enters again into the reflective polarizing sheet in a condition wherein the polarization is resolved (a condition including both the first linearly polarized light component and the second linearly polarized light component). Therefore, the reflective polarizing sheet transmits the first linearly polarized light component among the light incident again, and the second linearly polarized light component orthogonal to the first linearly polarized light component is reflected again. Thereafter, by repeating the above process, approximately 70% to 80% of the light emitted from the second layer is emitted as the light of the first linearly polarized light component. Therefore, when the LED backlight including the diffusion member in the present disclosure is used in a displaying apparatus, all the light emitted from the LED backlight is usable for imaging in a display panel, by matching the polarization direction of the first linearly polarized light component (transmission axis component) of the reflective polarizing sheet and the transmission axis direction of the polarizing plate of the display panel. Thus, even when the light energy input from the LED element is the same, a higher luminance image may be formed as compared with the case where the reflective polarizing sheet is not placed.

Examples of the reflective polarizing sheet may include a luminance improving film DBEF series from 3M Corporation. Further, as the reflective polarizing sheet, for example, a high luminance polarizing sheet WRPS from Shinwha Intertek Corporation, and a wire grid polarizer, for example, may be used.

6. Application

The diffusion member in the present disclosure is suitably used for a downlight type system LED backlight.

II. Second Embodiment of Diffusion Member

The second embodiment of the diffusion member in the present disclosure is a member including a transmission type diffractive grating or a microlens array, and a dielectric multi-layer. In its use of the diffusion member of the second embodiment in the present disclosure, the surface of the transmission type diffractive grating or the microlens array is used as the incident surface of the light.

In the second embodiment of the diffusion member in the present disclosure, the same effect as the first embodiment of the diffusion member described above may be achieved by combining the transmission type diffractive grating or the microlens array with the dielectric multi-layer.

The transmission type diffractive grating and the microlens array in the present embodiment may be similar to the transmission type diffractive grating and the microlens array used in the first layer in the first embodiment of the diffusion member described above.

Also, the dielectric multi-layer in the present embodiment may be similar to the dielectric multi-layer used for the second layer in the first embodiment of the diffusion member described above.

The transmission type diffractive grating and the microlens array may have any structures capable of exhibiting light diffusivity; for example, the light diffusivity may be exhibited with the entire layer, and the light diffusivity may be exhibited with the surface thereof.

As the arrangement of the transmission type diffractive grating or the microlens array and the dielectric multi-layer, for example, a transmission type diffractive grating or a microlens array may be placed on one surface of the dielectric multi-layer via an adhesive layer or a pressure-sensitive adhesive layer; a transmission type diffractive grating or a microlens array may be placed on one surface of the dielectric multi-layer via a void portion; and a transmission type diffractive grating or a microlens array may be placed directly on one surface of the dielectric multi-layer.

The transmission type diffractive grating or the microlens array and the dielectric multi-layer may or may not be in contact with each other, when the transmission type diffractive grating or the microlens array and the dielectric multi-layer are placed via the void portion. A spacer may be placed between the transmission type diffractive grating or the microlens array and the dielectric multi-layer, for example, when the transmission type diffractive grating or the microlens array and the dielectric multi-layer are not in contact. Also the void portion may be an air layer.

Further, when the transmission type diffractive grating or the microlens array is directly placed on one surface of the dielectric multi-layer, a transmission type diffractive grating or a microlens array may be directly formed on one surface of the dielectric multi-layer by, for example, a printing method or resin shaping by a mold.

The total thickness of the diffusion member in the present embodiment may be similar to the total thickness of the diffusion member in the first embodiment described above.

In the diffusion member in the present embodiment, the wavelength conversion member may be placed on the opposite surface side with respect to the transmission type diffractive grating or the microlens array side surface of the dielectric multi-layer; and the wavelength conversion member may be placed on the opposite surface side with respect to the dielectric multi-layer side surface of the transmission type diffractive grating or the microlens array. Incidentally, the wavelength conversion member may be similar to the wavelength conversion member described in the first embodiment of the diffusion member described above.

In the diffusion member in the present embodiment, an optical member may be placed on the opposite surface side with respect to the transmission type diffractive grating or the microlens array side surface of the dielectric multi-layer. Incidentally the optical member may be similar to the optical member described in the first embodiment of the diffusion member described above.

The diffusion member in the present embodiment is suitably used for a downlight type system LED backlight.

B. Stacked Body

The stacked body in the present disclosure may be classified into two embodiments. Hereinafter, each embodiment will be described.

I. First Embodiment of Stacked Body

The first embodiment of the stacked body in the present disclosure is a member comprising a diffusion member including a first layer and a second layer, in this order; and a sealing material sheet placed on a first layer side surface of the diffusion member, and configured to seal an LED element, wherein the first layer has a light transmissivity and a light diffusivity; in the second layer, a reflectance of light increases as an absolute value of an incident angle with respect to a first layer side surface of the second layer decreases, and a transmittance of light increases as an absolute value of an incident angle with respect to a first layer side surface of the second layer increases; and the sealing material sheet includes a sealing material composition containing a thermoplastic resin. In its use, the stacked body in the present disclosure uses the sealing material sheet side surface as an incident surface for the light from the LED element.

Figure 12:
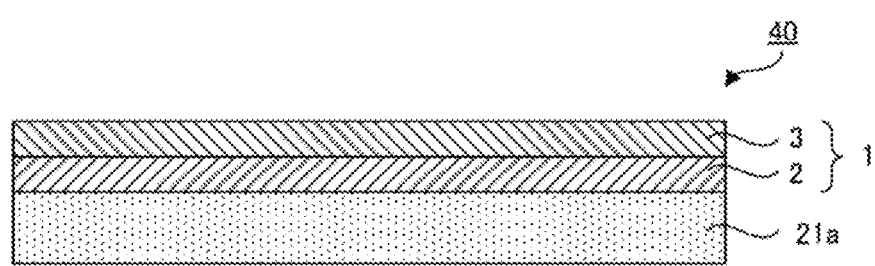
FIG. 12 is a schematic cross-sectional view illustrating an example of a stacked body in the present disclosure.

FIG. 12 is a schematic cross-sectional view illustrating an example of the first embodiment of the stacked body in the present disclosure. As illustrated in FIG. 12, stacked body 40 comprises diffusion member 1 including first layer 2 and second layer 3 in this order; and sealing material sheet 21a placed on first layer 2 side surface of diffusion member 1, and configured to seal an LED element. First layer 2 of diffusion member 1 has a light transmissivity and a light diffusivity. In second layer 3 of diffusion member 1, a reflectance of light increases as an absolute value of an incident angle with respect to first layer 2 side surface of second layer 3 decreases, and a transmittance of light increases as an absolute value of an incident angle with respect to first layer 2 side surface of second layer 3 increases. Sealing material sheet 21a includes a sealing material composition containing a thermoplastic resin.

Here, a downlight type system LED backlight is disadvantageous compared with an edge light type system, particularly in terms of the reduction of the thickness and weight. However, in a downlight type system LED backlight, as described above, it is difficult to reduce the thickness.

In recent years, research and development on miniaturization and densification of the LED element has been underway, and so-called a mini-LED and a micro-LED, having smaller chip size, have attracted attention. Thus, the technology of miniaturization and densification of the LED element is examined to be put into practical use as an LED backlight. (Such as Patent Literature 4)

In the downlight type system LED backlight, the luminance unevenness depends on the distance between the LED element and the diffusion plate as well as the distance between the LED elements (hereinafter, it may be referred to as pitch in some cases). Therefore, it is possible to suppress the luminance unevenness by shortening the distance between the LED elements. That is, by placing fine LED elements at a high density, it is possible to improve the in-plane uniformity of luminance. In this case, it is possible to realize the reduction of the thickness.

Here, in the LED backlight, a spacer is placed to maintain a predetermined distance between the LED element and the diffusion plate. However, luminance unevenness may occur due to the light emitted from the LED element being blocked or reflected by the spacer. Further, although it is necessary to provide a large number of spacers, it is difficult to place a large number of spacers when the pitch is fine, such as in a mini-LED or micro-LED.

Therefore, in the LED backlight, a configuration wherein a sealing member configured to seal the LED element is placed between the LED element and the diffusion plate, is also proposed (such as Patent Literature 4). However, the configuration including the sealing member placed between the LED element and the diffusion plate, is heavier than a configuration with space between the LED element and the diffusion plate.

Recently, there is a demand for the reduction of the thickness and the weight of a displaying apparatus, and further reduction of the thickness and the weight of the backlight to be incorporated in a displaying apparatus are required. As described above, the downlight type system LED backlight is disadvantageous in terms of the reduction of the thickness and the weight compared to the edge light type system, so that further improvement is required.

According to the present disclosure, by including the diffusion member described above, it is possible to achieve the reduction in the thickness while improving in-plane uniformity of luminance. Further, since it is possible to shorten the distance between the LED element and the diffusion member, the thickness of the sealing material sheet may be reduced so that the reduction in weight is also possible.

Also, in the present disclosure, the sealing material sheet includes a sealing material composition containing a thermoplastic resin. Hereinafter, reasons why the thermoplastic resin is preferable will be described.

Figure 13A:
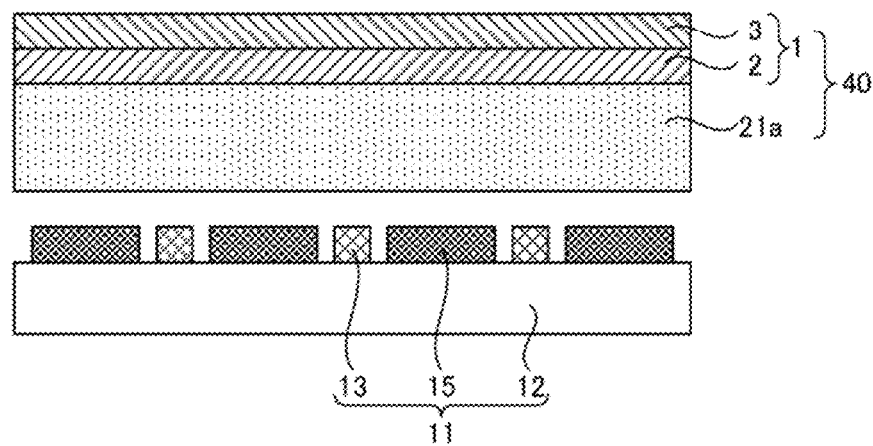
FIGS. 13A and 13B are process diagrams illustrating an example of a method for producing an LED backlight in the present disclosure.
Figure 13B:
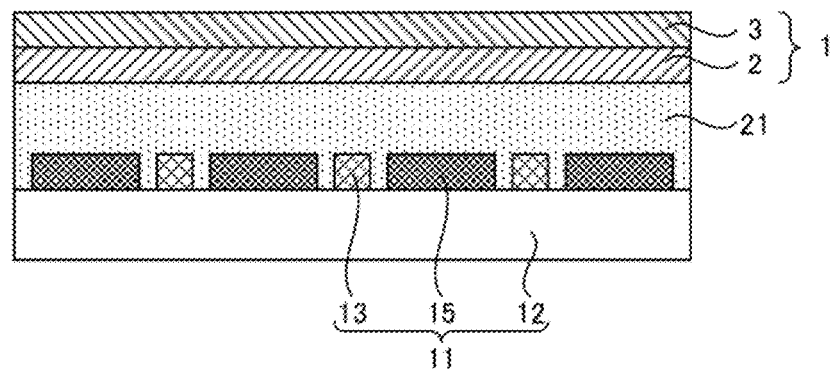

In an LED backlight, when the sealing member includes a thermoplastic resin, a sheet shaped sealing material (hereinafter, it may be referred to as a sealing material sheet in some cases) including a sealing material composition containing a thermoplastic resin, may be used. FIGS. 13A and 13B are process diagrams illustrating an example of a method for producing of an LED backlight in the present disclosure, and is an example of using the stacked body in the present disclosure. For example, as illustrated in FIG. 13A, by preparing LED substrate 11, and stacked body 40 of diffusion member 1 and sealing material sheet 21a; stacking sealing material sheet 21a on LED element 13 side surface of LED substrate 11; and then, crimping sealing material sheet 21a to LED element 13 using, for example, a vacuum lamination method, LED element 13 may be sealed with sealing member 21, as illustrated in FIG. 13B. Incidentally, FIGS. 13A and 13B illustrate an example wherein, in LED substrate 11, reflective layer 15 is placed on the surface of supporting substrate 12 on which LED element 13 is placed, in an area other than LED element mounting area on which LED element 13 is mounted.

Meanwhile, in an LED backlight, when the sealing member includes a curable resin such as a thermosetting resin and a photocurable resin, a liquid sealing material is usually used. In this case, as illustrated in FIG. 14A for example, by placing mold 101 around LED substrate 11; forming a coating layer by applying liquid sealing material 21b including a curable resin to LED element 13 side surface of LED substrate 11; and then, curing the coating film by heat treatment, LED element 13 may be sealed with sealing member 21' as illustrated in FIG. 14B.

Figure 14A:
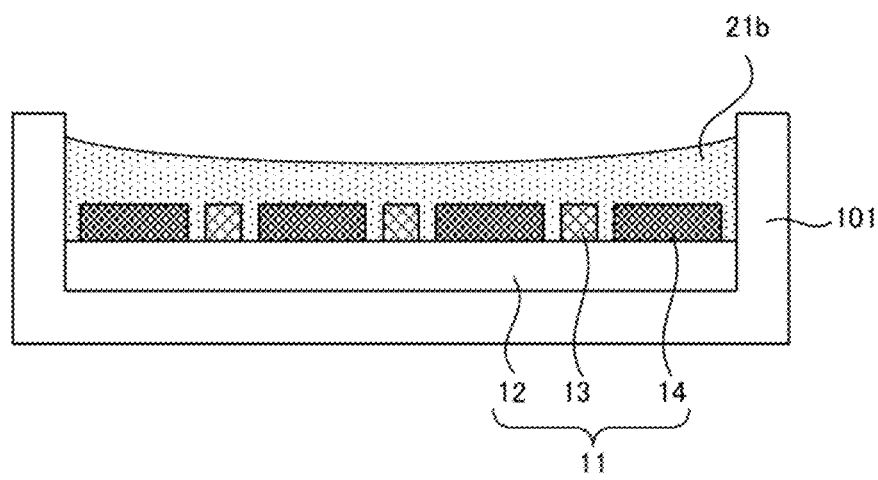
FIGS. 14A and 14B are process diagrams illustrating an example of a method for producing an LED backlight in the present disclosure.

In the case of a curable resin, since a liquid sealing material is used, a phenomenon wherein the thickness of the edge portion becomes thicker or thinner compared to the center portion, in relation to surface tension, for example, may occur (see FIG. 14A).

Figure 14B:
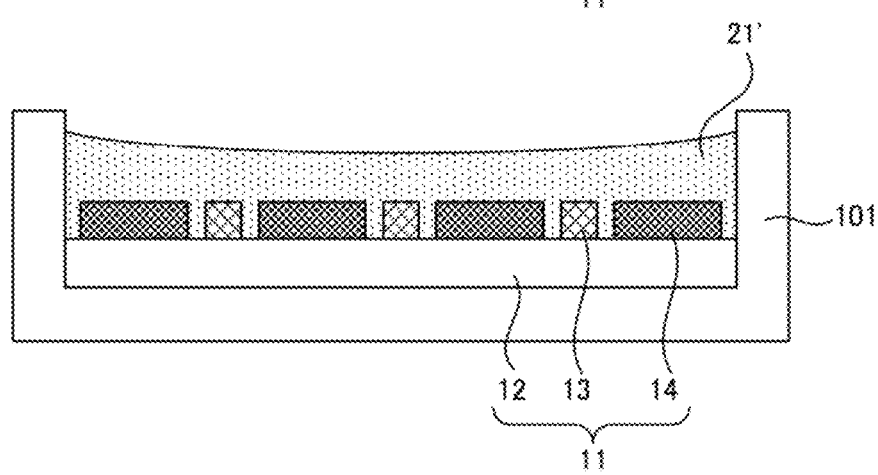

Also, in the case of a curable resin, shrinkage, for example, of the volume at the time of curing tends to occur, and as a result, the thickness of the center portion and the edge portion of the cured sealing member may become uneven, as illustrated in FIG. 14B. Incidentally, although FIG. 14B illustrates an example wherein the thickness of the edge portion of sealing member 21' is thicker than the thickness of the center portion, the distribution of the thickness is not limited thereto, and for example, there is a case wherein the thickness of the edge portion is thinner than the thickness of the center portion.

When the thickness differs between the center portion and the edge portion of the sealing member in this way, for example, when increasing the size by tiling a plurality of LED backlights, since the thickness at the border of each LED backlight differs, the difference is recognized as a joint as a consequence. Therefore, when the tiled LED backlight is used for a displaying apparatus, the appearance of the indication as a displaying apparatus may be deteriorated.

Meanwhile, when the sheet shaped sealing material is used, it is possible to avoid the occurrence of the surface unevenness of the sealing member such as the occurrence of the thickness distribution of the coating film due to the surface tension; and the occurrence of the thickness distribution due to the thermal shrinkage or the optical shrinkage, which occurs when the liquid sealing material is used. Therefore, it is possible to obtain a sealing member with good flatness, so that a high-quality displaying apparatus may be provided. Therefore, according to the present disclosure, by including the sealing material sheet described above, a sealing member having good flatness may be obtained. In particular, it is useful when LED substrates of a size referred to as mini-LED or micro-LED are tiled.

Hereinafter, the first embodiment of the stacked body in the present disclosure will be described.

1. Diffusion Member

The diffusion member in the present disclosure is similar to that described in the section "A. Diffusion member, I. First embodiment" above.

Figure 15A:
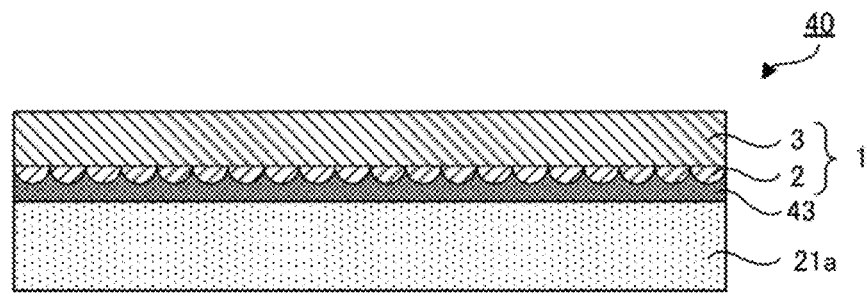
FIGS. 15A to 15C are schematic cross-sectional views illustrating an example of a stacked body in the present disclosure.
Figure 15B:
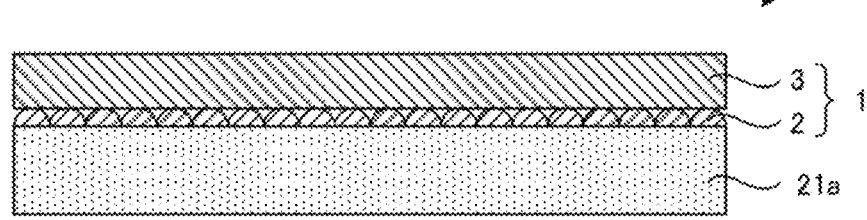
Figure 15C:
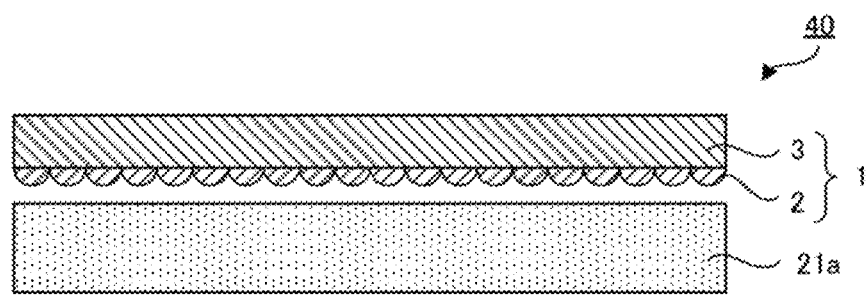

The arrangement of the diffusion member and the sealing material sheet is appropriately selected according to the type of the first layer of the diffusion member, and for example, as illustrated in FIG. 12, first layer 2 may be placed directly, or via an adhesive layer or a pressure-sensitive adhesive layer not illustrated in the figure, on one surface of second layer 3 of diffusion member 1, and sealing material sheet 21a may be placed directly on first layer 2 side surface of diffusion member 1; as illustrated in FIG. 15A, first layer 2 may be placed directly, or via an adhesive layer or a pressure-sensitive adhesive layer not illustrated in the figure, on one surface of second layer 3 of diffusion member 1, and sealing material sheet 21a may be placed on first layer 2 side surface of diffusion member 1 via low refractive layer 43; as illustrated in FIG. 15B, first layer 2 of diffusion member 1 may be placed directly on one surface of sealing material sheet 21a, and a void portion may be placed between first layer 2 and second layer 3 of diffusion member 1; and as illustrated in FIG. 15C, first layer 2 may be placed directly on one surface of second layer 3 of diffusion member 1, and a void portion may be placed between diffusion member 1 and sealing material sheet 21a. When the first layer of the diffusion member is, for example, a diffusing agent-containing resin film, any one of the arrangements of the diffusion member and the sealing material sheet described above, may be employed. Meanwhile, when the first layer of the diffusion member is, for example, a transmission type diffractive grating or a microlens array, it is necessary that a void portion is placed between the first layer and the second layer of the diffusion member; or a void portion is placed between the first layer of the diffusion member and the sealing material sheet; or a low refractive layer is placed between the first layer of the diffusion member and the sealing material sheet.

Also, when the first layer of the diffusion member is directly placed on one surface of the sealing material sheet, for example, as illustrated in FIG. 15B, first layer 2 in a pattern form may be placed on one surface of sealing material sheet 21a. For example, when the first layer is a layer wherein the light diffusivity is exhibited with the surface thereof, the light diffusivity may be exhibited even when the first layer is placed in a pattern form.

When the void portion is placed between the first layer and the second layer of the diffusion member, for example, as illustrated in FIG. 15B, first layer 2 and second layer 3 may be in contact with each other, and although not illustrated in the figure, the first layer and the second layer may not be in contact with each other. When the first layer and the second layer are not in contact, for example a spacer may be placed between the first layer and the second layer. When the void portion is placed between the diffusion member and the sealing material sheet, for example, the first layer of the diffusion member and the sealing material sheet may be in contact with each other; and the first layer of the diffusion member and the sealing material sheet may not be in contact with each other, as illustrated in FIG. 15C. When the first layer of the diffusion member and the sealing material are not in contact, for example, a spacer may be placed between the diffusion member and the sealing material sheet. Also, the void portion may be an air layer.

When the first layer of the diffusion member is directly placed on one surface of the sealing material sheet, the first layer of the diffusion member may be directly formed on one surface of the sealing material sheet by, for example, a printing method, and a resin shaping by a mold.

2. Sealing Material Sheet

Sealing material sheet in the present disclosure is a member configured to seal an LED element, and including a sealing material composition containing a thermoplastic resin.

The sealing material sheet has a light transmissivity. Incidentally, the terms "light transmissivity" and "transparent" in the sealing material sheet may be transparent to such an extent that the visibility of the light from LED element is not impaired.

(1) Material for Sealing Material Sheet

The sealing material sheet in the present disclosure includes a sealing material composition containing a thermoplastic resin.

As the thermoplastic resin used in the sealing material sheet in the present disclosure, a resin wherein a component that deteriorates an LED substrate (deterioration component) is not substantially generated, is usually used. Here, the "resin wherein a deterioration component is not substantially generate" refers to a resin not including the deterioration component itself; or an LED substrate is not deteriorated although a resin includes the deterioration component; or the deterioration component is not generated or an LED substrate is not deteriorated although the deterioration component is generated during the production and the use of an LED backlight.

Examples of the resin wherein such a deterioration component is generated may include an ethylene-vinyl acetate copolymer (EVA) which generates an acid component as a deterioration component.

Also as the thermoplastic resin in the present disclosure, those having melt viscosities capable of following and entering into the gap of the unevenness of the LED element and other members placed on one surface side of the LED substrate by being heated, are suitably used.

Specifically, the melt mass flow rate (MFR) of the thermoplastic resin to be used is preferably 0.5 g/10 min or more and 40 g/10 min or less, and more preferably 2.0 g/10 min or more and 40 g/10 min or less. By MFR being in the range described above, it is possible to enter into the gap of the LED element, so as to exhibit a sufficient sealing performance, and further, a sealing member excellent in adhesion to the LED substrate may be obtained.

Incidentally, the MFR in the present descriptions refers to a value measured according to JIS K7210 at 190° C. and load of 2.16 kg. However, the MFR of the polypropylene resin refers to a value of the MFR, similarly measured according to JIS K7210 at 230° C. and load of 2.16 kg.

For the MFR wherein the sealing material sheet is a multilayer member as will be described later, the MFR value of the multilayer sealing member is regarded as the measured value obtained by carrying out a measurement in a multilayer condition wherein all the layers are stacked as one, according to the measurement method described above.

The melting point of the thermoplastic resin used in the present disclosure is not particularly limited as long as LED element may be sealed at a temperature range wherein the LED substrate is not deteriorated, and is preferably, for example, 55° C. or more and 135° C. or less. The melting point of the thermoplastic resins may be measured, for example, by differential scanning calorimetry (DSC) in accordance with the plastic transition temperature measuring method (JISK7121).

In the present disclosure, for example, an olefin based resin, an ionomer based resin, and a polyvinyl butyral based resin may be used as the thermoplastic resin.

Among the above, the thermoplastic resin is preferably an olefin based resin. This is because the olefin based resin particularly rarely generates a component which deteriorates the LED substrate, and the melt viscosity is also low, so that the LED element described above may be well sealed. Further, among the olefin based resin, a polyethylene based resin or a polypropylene based resin is preferable.

Here, the polyethylene based resin in the present descriptions includes not only ordinary polyethylene obtained by polymerizing ethylene, but also a resin obtained by polymerizing a compound having an ethylenically unsaturated bond such as a α-olefin; a resin obtained by copolymerizing a plurality of different compounds having an ethylenically unsaturated bond; and a modified resin obtained by grafting another chemical species to these resins.

Among them, a silane copolymer obtained by copolymerizing an α-olefin and an ethylenically unsaturated silane compound as comonomers (hereinafter, also referred to as "silane copolymer") may be preferably used. By using such resins, it is possible to obtain higher adhesiveness between the LED substrate and the sealing member. As the above silane copolymer, those described in Japanese Patent Application Laid-Open (JP-A) No. 2018-50027 may be used.

(2) Structure of Sealing Material Sheet

Figure 16:
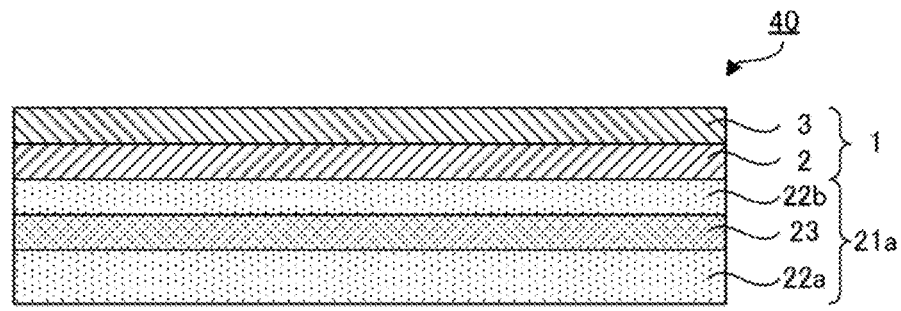
FIG. 16 is a schematic cross-sectional view illustrating an example of a stacked body in the present disclosure.

As the sealing material sheet in the present disclosure, for example, as illustrated in FIG. 12, sealing material sheet 21a may be a single-layer member including a single resin layer, or as illustrated in FIG. 16, sealing material sheet 21a may be a multi-layer member including a plurality of stacked resin layers (three layers in FIG. 16).

For the multi-layer member, a material having good adhesiveness and molding property capable of entering into the gap between the LED elements, for example, which is usually expensive, may be used for a layer located at the opposite side with respect to the diffusion member side in the multi-layer member, that is, for a layer located on the LED substrate side. The multi-layer member may have a two-layer structure, and it is preferable that the multi-layer member has a three-layered structure wherein layers having good adhesiveness are placed on both surfaces.

For the multi-layered member, the material included in a layer located on the opposite side with respect to the diffusion member side, that is, a layer located on the LED substrate side, is not particularly limited as long as the material has high adhesiveness and high molding property, and in the case of the thermoplastic resin, for example, it is preferable to use the silane copolymer described above, for example. Also, in the case of the thermoplastic resin, it is also preferable that the material includes the olefin based resin and a silane coupling agent.

The thickness of the sealing material sheet is not particularly limited, and may be appropriately selected according to the layer structure, for example of the LED substrate. The thickness of the sealing material sheet may be, for example, 100 μm or more, may be 250 μm or more, and may be 300 μm or more. Further, the thickness of the sealing material sheet may be, for example, 600 μm or less, and may be 550 μm or less. When the thickness is too small, the function as a sealing member may not be sufficiently exhibited, or luminance unevenness may occur. Meanwhile, when the thickness is too thick, the reduction of the thickness and weight become difficult, and there is a possibility that light transmissivity is adversely affected.

Also, when the sealing material sheet is a three-layered multi-layer member, the thickness of the layer located at the center among the three layers may be, for example, 60 μm or more, may be 100 μm or more, and may be 250 μm or more. Also, the thickness may be 400 μm or less, and may be 350 μm or less. Also, in this case, the thickness of each layer located outer side of the three layers may be, for example, 15 μm or more and 200 μm or less.

Incidentally, the "thickness" in the present descriptions may be measured using a known measurement method capable of measuring a μ-order size, and as an example, the thickness may be measured using an observation image by an optical microscope or a scanning electron microscope (SEM). The same applies to the measurement of the dimension such as "size".

(3) Others

The sealing material composition used for the sealing material sheet may include a thermoplastic resin, and may include other additives such as a crosslinking agent, a silane coupling agent, an antioxidant, and a light stabilizer, for example, if necessary. Also, the method for molding the sealing material sheet may be similar to a common molding method for a resin sheet. A T-die process may be listed as an example, however, not limited to.

(4) Specific Embodiment of Sealing Material Sheet

As described above, the sealing material sheet includes a thermoplastic resin, more preferably includes an olefin based resin, and still more preferably includes a polyethylene based resin. In particular, it is preferable that the base resin for the sealing material sheet is a polyethylene based resin having a density of 0.870 g/cm$^3$ or more and 0.930 g/cm$^3$ or less. This is because such a sealing material sheet has good adhesiveness to the LED substrate and good follow-up ability to the members placed on the LED substrate.

Preferable sealing material sheet will be described in detail below.

The sealing material sheet is a resin film including a polyethylene based resin of 0.870 g/cm$^3$ or more and 0.930 g/cm$^3$ or less, as a base resin. In other words, the sealing material sheet is a sealing material sheet including the polyethylene based resin described above as a base resin.

The sealing material sheet is preferably a multi-layer film including a plurality of layers including a core layer, and a skin layer placed on both outermost surfaces. In this instance, it is preferable that the core layer includes a polyethylene based resin having a density of 0.910 g/cm$^3$ or more and 0.930 g/cm$^3$ or less, as a base resin; and the skin layer preferably includes a polyethylene based resin having a density of 0.890 g/cm$^3$ or more and 0.910 g/cm$^3$ or less with lower density than the base resin for the core layer, as a base resin.

In the case of the multi-layer film, the total thickness thereof is preferably, for example, 100 μm or more, more preferably 250 μm or more, and still more preferably 300 μm or more. Further, the total thickness is preferably, for example, 600 μm or less, and more preferably 550 μm or less. When the total thickness is too thin, the impact may not be sufficiently relieved, and when the total thickness is in the above range, both of the molding property and the heat resistance may be provided at a sufficiently preferable level. When the total thickness is too thick, no further impact reliving effect may be obtained, the demand for reducing the thickness may not be dealt with, and is uneconomical.

The thickness of the core layer in the multi-layer film is preferably, for example, 60 μm or more, more preferably 100 μm or more, and still more preferably 250 μm or more. Further, the thickness of the core layer is preferably, for example, 400 μm or less, and more preferably 350 μm or less. Also, the thickness of each of the skin layer in this case may be, for example, 15 μm or more, and may be 30 μm or more. Also, the thickness may be 200 μm or less. By setting the thickness of each layer in such a range, the heat resistance and molding property of the sealing material sheet may be maintained in a good range.

The sealing material sheet is obtained by forming a sealing material composition which will be described in detail below, into a sheet shape by molding by a conventionally known method.

When the sealing material sheet is formed as a sealing member, the sealing material composition used for the production of each layer includes a composition having a different density range, for example for each layer, as a base resin.

In this case, as for the sealing material composition, the sealing material composition for the core layer and the sealing material composition for the skin layer are selectively used for forming each layer, respectively. By forming multi-layered films having a three-layered structure wherein skin layers are placed on both outermost surfaces, with each of the respective sealing material compositions for the core layer and the skin layer, with predetermined thicknesses, as illustrated in FIG. 16 for example, sealing material sheet 21a having a three-layered structure of skin layer 22a, core layer 23, and skin layer 22b may be produced.

As the base resin of the sealing material composition for the core layer of the sealing material sheet, a low-density polyethylene based resin (LDPE), a linear low-density polyethylene based resin (LLDPE), or a metallocene based linear low-density polyethylene based resin (M-LLDPE) may be preferably used. Among them, from the viewpoint of long-term reliability, a low-density polyethylene based resin (LDPE) may be particularly preferably used as a composition for the core layer.

The density of the polyethylene based resin used as the base resin of the sealing material composition for the core layer is 0.910 g/cm$^3$ or more and 0.930 g/cm$^3$ or less, and more preferably 0.920 g/cm$^3$ or less. By setting the density of the base resin of the sealing material composition for the core layer in the above range, it is possible to provide sufficient heat resistance required for sealing material sheet without undergoing a crosslinking treatment.

The melting point of the sealing material composition for the core layer is preferably 90° C. or more and 135° C. or less, and more preferably 100° C. or more and 115° C. or less. By setting the melting point of the core layer in the above melting point range, the heat resistance and the molding property of these sealing material compositions may be maintained in a preferable range. Incidentally, by adding a resin having a high melting point such as polypropylene to the sealing material composition for the core layer, it is possible to increase the melting point of the sealing material composition to approximately 135° C. In this case, 5% by mass or more and 40% by mass or less of the polypropylene is preferably included, with respect to the total resin components of the core layer.

The polypropylene to be included in the core layer is preferably a homopolypropylene (homoPP) resin. Since homoPP is a polymer including only polypropylene monomer and has high crystallinity, it has even higher rigidity compared with block PP and random PP. By using this as an additive resin to the sealing material composition for the core layer, the dimensional stability of the sealing member may be increased. Further, the MFR measured according to JIS K7210 at 230° C. and at a load of 2.16 kg, of the homoPP used as an additive resin to the sealing material composition for the core layer is preferably 5 g/10 min or more and 125 g/10 min or less. When the MFR is too low, the molecular weight is increased so that the rigidity is too high, and the preferable sufficient flexibility of the sealing material composition is hardly ensured. Also, when the MFR is too high, the fluidity at the time of heating may not be sufficiently suppressed, and the heat resistance and dimensional stability may not be sufficiently imparted to the sealing material sheet.

The melt mass flow rate (MFR) of the polyethylene based resin used as the base resin of the sealing material composition for the core layer is preferably 2.0 g/10 min or more and 7.5 g/10 min or less, and more preferably 3.0 g/10 min or more and 6.0 g/10 min or less, at 190° C., and at a load of 2.16 kg. By setting the MFR of the base resin of the sealing material composition for the core layer in the above range, the heat resistance and the molding property of the sealing member may be maintained in a preferable range. Also, the processability at the time of film formation may be sufficiently enhanced to contribute to the improvement of the productivity of the sealing member.

The content of the base resin with respect to the total resin components in the sealing material composition for the core layer is 70% by mass or more and 99% by mass or less, and preferably 90% by mass or more and 99% by mass or less. As long as it includes the base resin in the above range, other resins may be included.

As the base resin of the sealing material composition for the skin layer of the sealing material sheet, a low-density polyethylene based resin (LDPE), a linear low-density polyethylene based resin (LLDPE), or a metallocene based linear low-density polyethylene based resin (M-LLDPE) may be preferably used, as the sealing material composition for the core layer. Among them, from the viewpoint of molding property, a metallocene based linear low-density polyethylene based resin (M-LLDPE) may be particularly preferably used as the sealing material composition for a skin layer.

The density of the polyethylene based resin used as the base resin of the sealing material composition for the skin layer is 0.890 g/cm$^3$ or more and 0.910 g/cm$^3$ or less, and more preferably 0.899 g/cm$^3$ or less. By setting the density of the base resin of the sealing material composition for the skin layer in the above range, the adhesiveness of the sealing member may be maintained in a preferable range.

The melting point of the sealing material composition for the skin layer is preferably 55° C. or more and 100° C. or less, and more preferably 80° C. or more and 95° C. or less. By setting the melting point of the sealing material composition for the skin layer in the above range, the adhesiveness of the sealing member may further be improved for sure.

The melt mass flow rate (MFR) of the polyethylene based resin used as the base resin of the sealing material composition for the skin layer is preferably 2.0 g/10 min or more and 7.0 g/10 min or less, and more preferably 2.5 g/10 min or more and 6.0 g/10 min or less, at 190° C., and at a load of 2.16 kg. By setting the MFR of the base resin of the sealing material composition for the skin layer in the above range, the adhesiveness of the sealing material sheet my further be maintained in a preferable range for sure. Also, the processability at the time of film formation may be sufficiently enhanced to contribute to the improvement of the productivity of the sealing material sheet.

The content of the base resin with respect to the total resin components in the sealing material composition for the skin layer is 60% by mass or more and 99% by mass or less, and preferably 90% by mass or more and 99% by mass or less. As long as it includes the base resin in the above range, other resins may be included.

In all of the sealing material compositions described above, it is more preferable that a silane copolymer obtained by copolymerizing an α-olefin and an ethylenically unsaturated silane compound as comonomers, is included in each of the sealing material compositions in a constant amount, if necessary. Since degree of freedom of a silanol group contributing to an adhesive force, of such a graft copolymer is high, adhesiveness of the sealing material sheet to other members may be improved.

Examples of the silane copolymer may include a silane copolymer described in JP-A No. 2003-46105. By using the silane copolymer as a component of the sealing material composition, a sealing material sheet having the following properties may be obtained stably at low cost: excellent in strength, and durability, for example; excellent in weather resistance, heat resistance, water resistance, light resistance, and various other characteristics; and further, exhibits outstanding heat fusion property, not being affected by production conditions such as heat compression bonding at the time of placing the sealing material sheet.

As the silane copolymer, any of a random copolymer, an alternating copolymer, a block copolymer, and a graft copolymer may be preferably used, and a graft copolymer is more preferable, and a graft copolymer obtained by polymerizing a polyethylene for polymerization as a main chain, and an ethylenically unsaturated silane compound as a side chain is further preferable. Since degree of freedom of a silanol group contributing to an adhesive force, of such a graft copolymer is high, adhesiveness of the sealing material sheet may be improved.

The content of an ethylenically unsaturated silane compound constituting the copolymer of an α-olefin and an ethylenically unsaturated silane compound is, for example, 0.001% by mass or more and 15% by mass or less, preferably 0.01% by mass or more and 5% by mass or less, and particularly preferably 0.05% by mass or more and 2% by mass or less, with respect to the total copolymer mass. Although the mechanical strength, and the heat resistance, for example, are good when the content of the ethylenically unsaturated silane compound constituting the copolymer of the α-olefin and the ethylenically unsaturated silane compound is high, the tensile elongation, and heat fusibility, for example, tends to be low, when the content thereof is excessive.

The content of the silane copolymer with respect to the total resin components of the sealing material composition is preferably 2% by mass or more and 20% by mass or less in the sealing material composition for the core layer, and 5% by mass or more and 40% by mass or less in the sealing material composition for the skin layer. In particular, it is more preferable that 10% by mass or more of the silane copolymer is included in the sealing material composition for the skin layer. Incidentally, the silane modification amount in the silane copolymer is preferably approximately 1.0% by mass or more and 3.0% by mass or less. The content range of the preferable silane copolymer in the sealing material composition described above assume that the silane modification amount is in this range, and it is desirable to appropriately adjust finely according to the variation of this modification amount.

Also, an adhesion improving agent may be added to all of the sealing material compositions as appropriate. By adding the adhesion improving agent, the adhesiveness durability with other members may be enhanced. As the adhesion improving agent, a known silane coupling agent may be used, and a silane coupling agent including an epoxy group or a silane coupling including a mercapto group may be particularly preferably used.

3. Wavelength Conversion Member

Figure 17A:
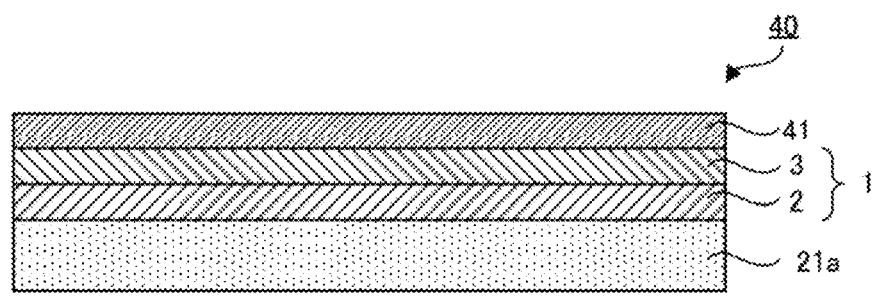
FIGS. 17A and 17B are schematic cross-sectional views illustrating an example of a stacked body in the present disclosure.
Figure 17B:
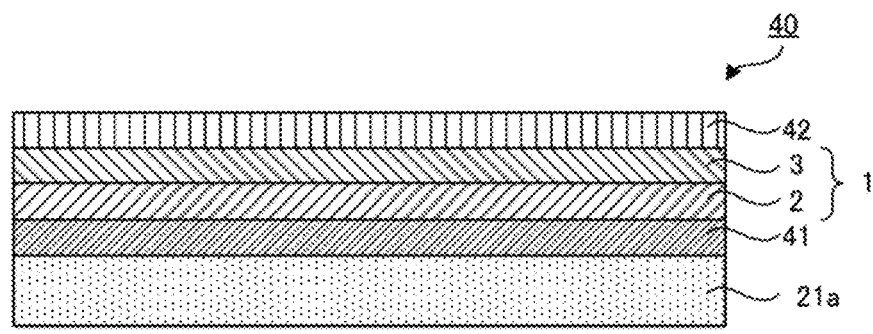

In the stacked body in the present disclosure, as illustrated in FIG. 17A for example, wavelength conversion member 41 may be placed on second layer 3 side surface of diffusion member 1; and as illustrated in FIG. 17B, wavelength conversion member 41 may be placed between diffusion member 1 and sealing material sheet 21a. The wavelength conversion member may be similar to the wavelength conversion member described in the section "A. Diffusion member" above.

4. Optical Member

In the stacked body in the present disclosure, as illustrated in FIG. 17B for example, optical member 42 may be placed on second layer 3 side surface of diffusion member 1. The optical member may be similar to the optical member described in the section "A. Diffusion member" above.

5. Other Configurations

In the stacked body in the present disclosure, as illustrated in FIG. 15A for example, when low refractive index layer 43 is placed between first layer 2 of diffusion member 1 and sealing material sheet 21a, the low refractive index layer is a layer having a refractive index lower than that of the first layer of the diffusion member. The total reflection may be suppressed by the refractive index of the low refractive index layer being lower than that of the first layer of the diffusion member. Further, in the stacked body in the present embodiment, as described above, the sealing material sheet side surface is used as the incident surface of the light of the LED element, and when the first layer of the diffusion member is, for example, a transmission type diffractive grating or a microlens array, by the low refractive index layer having a refractive index different from that of the first layer being placed on the light incident side of the first layer of the diffusion member, the light may be diffracted by the transmission type diffractive grating, or the light may be refracted by the microlens array.

The refractive index of the low refractive index layer may be lower than that of the first layer of the diffusion member, and may be, for example, 1.0 or more and 1.5 or less. Also, the refractive index difference between the low refractive index layer and the first layer of the diffusion member is preferably larger, and may be, for example, 0.3 or more and 1.0 or less. The large refractive index difference between the low refractive index layer and the first layer of the diffusion member enables the angle of refraction to be increased when the first layer is, for example, a microlens array or a diffusing agent-containing resin film, and the angle of diffraction to be increased when the first layer is, for example, a transmission type diffractive grating.

The low refractive index layer may be, for example, one including a resin and low refractive index particles, and may be one including a fluorine-containing resin. When the low refractive index layer includes a resin and low refractive index particles, the low refractive index particles may be, for example, any one of inorganic particles and organic particles. Further, the low refractive index particles may be hollow particles. Further, as the resin, for example, a curable resin may be used.

II. Second Embodiment of Stacked Body

The second embodiment of the stacked body in the present disclosure is a member comprising: a diffusion member including a transmission type diffractive grating or a microlens array, and a dielectric multi-layer; and a sealing material sheet placed on a transmission type diffractive grating or a microlens array side surface of the diffusion member, and configured to seal an LED element, wherein the sealing material sheet includes a sealing material composition containing a thermoplastic resin. In its use, the stacked body in the present embodiment uses the sealing material sheet side surface as an incident surface for the light from the LED element.

In the second embodiment of the stacked body in the present disclosure, the same effect as in the first embodiment of the stacked body described above may be achieved.

The diffusion member in the present embodiment is similar to that described in the section "A. Diffusion member, II. Second embodiment" above.

As an arrangement of the diffusion member and the sealing material sheet, for example, the transmission type diffractive grating or the microlens array may be placed on one surface of the dielectric multi-layer of the diffusion member directly or via an adhesive layer or a pressure-sensitive adhesive layer, and the sealing material sheet may be placed on the transmission type diffractive grating or the microlens array side surface of the diffusion member via a low refractive index layer; the transmission type diffractive grating or the microlens array of the diffusion member may be placed directly on one surface of the sealing material sheet, and a void portion may be placed between the dielectric multi-layer and the transmission type diffractive grating or the microlens array of the diffusion member; and the transmission type diffractive grating or the microlens array may be placed directly on one surface of the dielectric multi-layer of the diffusion member, and a void portion may be placed between the diffusion member and the sealing material sheet.

The configuration when the void portion is placed between the transmission type diffractive grating or the microlens array and the dielectric multi-layer of the diffusion member may be similar to that when the void portion is placed between the first layer and the second layer of the diffusion member in the first embodiment of the stacked body described above. Further, the configuration when the void portion is placed between the diffusion member and the sealing material sheet may be similar to that when the void portion is placed between the diffusion member and the sealing material sheet in the first embodiment of the stacked body described above.

When the transmission type diffractive grating or the microlens array of the diffusion member is directly placed on one surface of the sealing material sheet, the transmission type diffractive grating or the microlens array of the diffusion member may be directly formed on one surface of the sealing material sheet by, for example, a printing method, and a resin shaping by a mold, for example.

Also, the sealing material sheet in the present embodiment may be similar to the sealing material sheet in the first embodiment of the stacked body described above.

Also, the low refractive index layer in the present embodiment may be similar to the low refractive index layer in the first embodiment of the stacked body described above.

In the stacked body in the present embodiment, the wavelength conversion member may be placed on the dielectric multi-layer side surface of the diffusion member; and the wavelength conversion member may be placed between the diffusion member and the sealing material sheet. The wavelength conversion member may be similar to the wavelength conversion member described in the section "A. Diffusion member" above.

Further, in the stacked body in the present embodiment, the optical member may be placed on the dielectric multi-layer side surface of the diffusion member. The optical member may be similar to the optical member described in the section "A. Diffusion member" above.

C. Diffusion Member Set

The diffusion member set in the present disclosure comprises: a first member including a first layer, and a sealing material sheet configured to seal an LED element, and a second member including a second layer, and being used by placing on the first layer side surface of the first member via a void portion, wherein the first layer has a light transmissivity and a light diffusivity, in the second layer, a reflectance of light increases as an absolute value of an incident angle with respect to a first layer side surface of the second layer decreases, and a transmittance of light increases as an absolute value of an incident angle with respect to a first layer side surface of the second layer increases, and the sealing material sheet includes a sealing material composition containing a thermoplastic resin.

Figure 18:
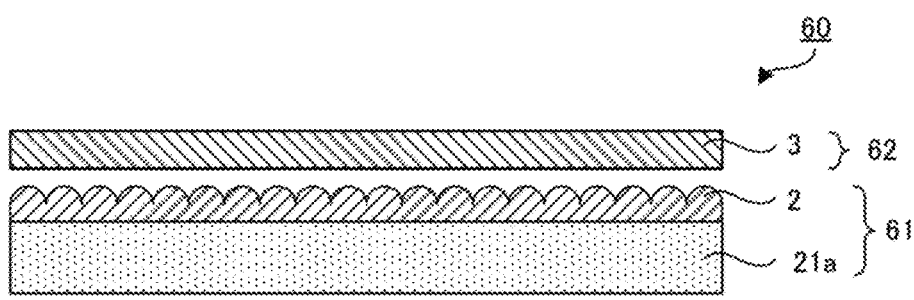
FIG. 18 is a schematic cross-sectional view illustrating an example of a diffusion member set in the present disclosure.

As illustrated in FIG. 18, diffusion member set 60 comprises first member 61 including first layer 2, and sealing material sheet 21a configured to seal an LED element, and second member 62 including second layer 3. Second member 62 is used by placing on first layer 2 side surface of first member 61 via a void portion. First layer 2 has a light transmissivity and a light diffusivity. Also, second layer 3 has incident angle dependency in reflectance and incident angle dependency in transmittance.

The similar effects as those of the stacked body described above may be achieved in the diffusion member set in the present disclosure.

The first member and the second member are separate members, and may be used as a diffusion member by placing the first member and the second member via a void portion.

The first layer and the second layer in the present disclosure are similar to the first layer and the second layer described in the section "A. Diffusion member" above.

Also, the sealing material sheet in the present disclosure is similar to the sealing material sheet described in the section "B. Stacked body" above.

In the first member, a wavelength conversion member may be placed between the first layer and the sealing material sheet. Meanwhile, in the second member, a wavelength conversion member may be placed on one surface of the second layer. Also, in the second member, an optical member may be placed on one surface of the second layer. The wavelength conversion member and the optical member may be similar to the wavelength conversion member and the optical member described in the section "A. Diffusion member" above.

D. LED Backlight

The LED backlight in the present disclosure may be classified into two embodiments. Hereinafter, each embodiment will be described.

I. First Embodiment of LED Backlight

The first embodiment of the LED backlight in the present disclosure is an apparatus comprising: an LED substrate including a plurality of LED elements placed on one surface side of a supporting substrate, and a diffusion member placed on the LED element side surface of the LED substrate, and including a first layer and a second layer in this order from the LED substrate side, wherein the first layer has a light transmissivity and a light diffusivity, in the second layer, a reflectance of light increases as an absolute value of an incident angle with respect to a first layer side surface of the second layer decreases, and a transmittance of light increases as an absolute value of an incident angle with respect to a first layer side surface of the second layer increases. The LED backlight in the present disclosure is a downlight type system LED backlight.

FIG. 2 is a schematic cross-sectional view illustrating an example of an LED backlight in the present disclosure. Since FIG. 2 is described in the section "A. Diffusion member" above, the explanation thereof is omitted here.

Figure 19:
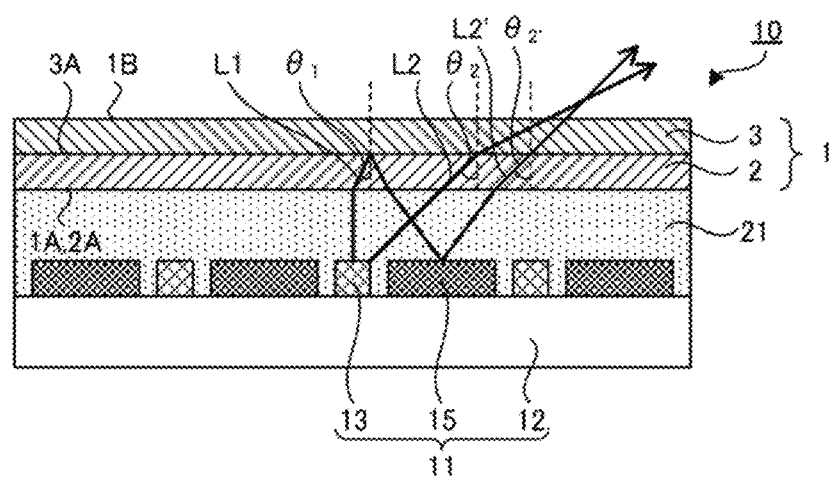
FIG. 19 is a schematic cross-sectional view illustrating an example of an LED backlight in the present disclosure.

FIG. 19 is a schematic cross-sectional view illustrating another example of the LED backlight in the present disclosure. As illustrated in FIG. 19, LED backlight 10 comprises: LED substrate 11 including a plurality of LED elements 13 placed on one surface side of supporting substrate 12; sealing member 21 placed on LED element 13 side surface of LED substrate 11, and configured to seal LED element 13; and diffusion member 1 placed on the opposite surface side to LED substrate 11 side surface of sealing member 21, and including first layer 2 and second layer 3 in this order from sealing member 21. First layer 2 in diffusion member 1 has light transmissivity and light diffusivity, and transmits and diffuses incident lights L1, L2, L2' from opposite surface 2A with respect to second layer 3 side surface of first layer 2. Also, in second layer 3 in diffusion member 1, a reflectance of light increases as an absolute value of the incident angle with respect to first layer 2 side surface 3A of second layer 3 decreases, and a transmittance of light increases as an absolute value of the incident angle with respect to first layer 2 side surface 3A of second layer 3 increases. Therefore, in second layer 3, it is possible to reflect incident light L1 with low incident angle $\theta_1$ with respect to first layer 2 side surface 3A of second layer 3, and to transmit incident light L2, L2' with high incident angle $\theta_2, \theta_2'$ with respect to first layer 2 side surface 3A of second layer 3. Incidentally, FIG. 19 illustrates an example wherein, in LED substrate 11, reflective layer 15 is placed on the surface of supporting substrate 12 on which LED element 13 is placed, in an area other than LED element mounting area on which LED element 13 is mounted.

In FIG. 19, it is possible to diffuse the incident light from LED element 13 to first layer 2 side surface 1A of diffusion member 1 by first layer 2; as well as to reflect incident light L1 with low incident angle $\theta_1$ with respect to first layer 2 side surface 3A of second layer 3, among the light transmitted and diffused through first layer 2, by first layer 2 side surface 3A of second layer 3; and to diffuse by making the light to enter into first layer 2 again. Also, among the light transmitted and diffused through first layer 2, incident light L2 and L2' with high incident angle $\theta_2$, $\theta_2'$ with respect to first layer 2 side surface 3A of second layer 3 may be transmitted through second layer 3, and may be emitted from second layer 3 side surface 1B of diffusion member 1.

In the present disclosure, by including the diffusion member described above, it is possible to achieve the reduction of the thickness while improving in-plane uniformity of luminance. It is also possible to reduce the cost and power consumption. Further, since it is possible to shorten the distance between the LED element and the diffusion member, the thickness of the sealing member may be reduced so that the reduction of weight is also possible. Also, by using the diffusion member described above, the LED backlight in the present disclosure may be easily produced.

Hereinafter, the first embodiment of the LED backlight in the present disclosure will be described.

1. Diffusion Member

The diffusion member in the present disclosure is a member placed on the LED element side surface of the LED substrate, and including a first layer and a second layer in this order from the LED substrate side, wherein the first layer has a light transmissivity and a light diffusivity, in the second layer, a reflectance of light increases as an absolute value of an incident angle with respect to a first layer side surface of the second layer decreases, and a transmittance of light increases as an absolute value of an incident angle with respect to a first layer side surface of the second layer increases.

The diffusion member in the present disclosure is similar to the member described in the section "A. Diffusion member" above. Since the members constituting the diffusion member may be similar to those described in the section "A. Diffusion member" above, and description thereof is omitted herein.

The diffusion member is placed apart from the light emitting surface of the LED element of the LED substrate, by a predetermined distance. The distance between the diffusion member and the light emitting surface of the LED element of the LED substrate is preferably, for example, 5 mm or less, more preferably 2 mm or less, and particularly preferably 1 mm or less. When the distance is in the above range, the thickness may be reduced. The lower limit of the distance is not particularly limited.

Here, the distance between the diffusion member and the light emitting surface of the LED element of the LED substrate is, as illustrated in FIG. 2 for example, distance "d" between first layer 2 side surface 1A of diffusion member 1 and the light emitting surface of LED element 13 of LED substrate 11.

2. LED Substrate

The LED substrate in the present disclosure is a member wherein a plurality of LED elements are placed on one surface side of the supporting substrate.

Hereinafter, the LED substrate in the present disclosure will be described.

(1) LED Element

In the LED backlight in the present disclosure, the LED element functions as a light source.

The LED backlight in the present disclosure may be a white LED. The LED element is not particularly limited as long as it may irradiate white light when used as an LED backlight, and examples thereof may include an LED element capable of emitting white color, blue color, ultraviolet ray, and infrared ray.

The LED element may be a chip shaped LED element. The form of the LED element may be, for example, a light emitting portion (also referred to as a LED chip.) itself; and may be a packaged LED (also referred to as a chip LED) such as a surface mounted type and a chip-on-board type. The package LED may include, for example, a light emitting portion, and a protective portion including a resin and covering the light emitting portion. Specifically, when the LED element is the light emitting portion itself, for example, a blue LED element, an ultraviolet LED element, and an infrared LED element may be used as the LED element. Also, when the LED element is a packaged LED, a white LED element, for example, may be used as the LED element.

When the LED backlight in the present disclosure is intended to irradiate white color by combining the LED element and the wavelength conversion member, the LED element is preferably a blue LED element, an ultraviolet LED element, or an infrared LED element. As for the blue LED element, a white light may be produced, for example, by combining with a yellow fluorescent substance; or by combining with a red fluorescent substance and a green fluorescent substance. The ultraviolet LED element may produce a white light, for example by combining with a red fluorescent substance, a green fluorescent substance, and a blue fluorescent substance. Among the above, the LED element is preferably the blue LED element. The reason therefor is to irradiate a high luminance white light in the LED backlight in the present disclosure.

Also, when the LED element is a white LED element, the white LED element is appropriately selected according to the light emission method, for example of the white LED element. Examples of the emission method of the white LED element may include a combination of a red LED, a green LED, and a blue LED; a combination of a blue LED, a red fluorescent substance, and a green fluorescent substance; a combination of a blue LED and a yellow fluorescent substance; a combination of a ultraviolet LED, a red fluorescent substance, a green fluorescent substance, and a blue fluorescent substance. Therefore, the white LED element, for example, may include a red LED light emitting portion, a green LED light emitting portion, and a blue LED light emitting portion; may include a blue LED light emitting portion, a protective portion including a red fluorescent substance and a green fluorescent substance; may include a blue LED light emitting portion, and a protective portion including a yellow fluorescent substance; and may include an ultraviolet LED light emitting portion, and a protective portion including a red fluorescent substance, a green fluorescent substance, and a blue fluorescent substance. Among these, the white LED element preferably includes a blue LED light emitting portion, and a protective portion including a red fluorescent substance and a green fluorescent substance; a blue LED light emitting portion, and a protective portion including a yellow fluorescent substance; or an ultraviolet LED light emitting portion and a protective portion including a red fluorescent substance, a green fluorescent substance, and a blue fluorescent substance. Among the above, the white LED element preferably includes a blue LED light emitting portion, and a protective portion including a red fluorescent substance and a green fluorescent substance; or a blue LED light emitting portion, and a protective portion including a yellow fluorescent substance. The reason therefor is to enable to irradiate a high luminance white light, in the LED backlight in the present disclosure.

The structure of the LED element may be similar to that of a common LED element.

The LED element is usually placed on one surface side of the supporting substrate at an equal interval. The arrangement of the LED element is appropriately selected according to the use and size of the LED backlight in the present disclosure, and the size of the LED element, for example. Also, the arrangement density of the LED element is also appropriately selected according to the use and size of the LED backlight in the present disclosure, and the size of LED element, for example.

The size (chip size) of the LED element is not particularly limited, and may be a common chip size. Also, the size of the LED element may also be a chip size called a mini-LED and a micro-LED. Among the above, when the sealing member is placed, the chip size is preferably a chip size called a mini-LED. Specifically, the size of the LED element may be hundreds of micrometers square, and may be tens of micrometers square. More specifically, the size of the LED element may be 100 µm square or more and 300 µm square or less. When the size of the LED element is small, the LED element may be placed at high density, that is, the interval (pitch) between the LED elements may be reduced. Therefore, even when the distance between the LED substrate and diffusion member is shortened, luminance unevenness may be suppressed. Therefore, further reduction of the thickness is possible. Further, it is possible to shorten the distance between the LED substrate and the diffusion member, that is, to reduce the thickness of the sealing member so that the weight may be reduced.

(2) Supporting Substrate

The supporting substrate in the present disclosure is a member configured to support the LED element, for example.

The supporting substrate may be transparent, and may be opaque. Also, the supporting substrate may be flexible, and may be rigid. The material of the supporting substrate may be an organic material, may be an inorganic material, and may be a composite material obtained by combining both of an organic material and an inorganic material.

When the material of the supporting substrate is an organic material, a resin substrate may be used as the supporting substrate. Meanwhile, when the material of the supporting substrate is an inorganic material, a ceramic substrate, and a glass substrate may be used as the supporting substrate. Also, when the material of the supporting substrate is a composite material, a glass-epoxy substrate may be used as the supporting substrate. Also, for example, a metal core substrate may also be used as the supporting substrate. A printed circuit substrate on which a circuit is formed by printing, may also be used as the supporting substrate.

The thickness of the supporting substrate is not particularly limited, and is appropriately selected according to the presence or absence of the flexibility or rigidity, and the use and size, for example, of the LED backlight in the present disclosure.

(3) Others

The LED substrate in the present disclosure is not particularly limited as long as the LED substrate includes the supporting substrate and the LED element described above, and may have a required configuration as appropriate. Examples of such a configuration may include a wiring portion, a terminal portion, an insulating layer, reflective layer, and a heat radiating member. Each configuration may be similar to those used for a known LED substrate.

The wiring portion are electrically connected to the LED element. The wiring portion is usually placed in a pattern form. Also, the wiring portion may be placed on the supporting substrate via an adhesive layer. As a material of the wiring portion, for example, a metal material, and a conductive polymer material may be used.

The wiring portion is electrically connected to the LED element by a joining portion. As a material of the joining portion, for example, a joining agent including a conductive material such as a metal or a conductive polymer, and a solder may be used.

The reflective layer may be placed on the surface of the supporting substrate on which the LED element is placed, in an area other than the LED element mounting area. The light reflected by the second layer of the diffusion member may be reflected by the reflective layer of the LED substrate, and then, may be entered again into the first layer of the diffusion member, to increase the utilization of the light.

The reflective layer may be similar to a reflective layer commonly used for an LED substrate. Specifically, examples of the reflective layer may include a white resin film including metal particles, inorganic particles or pigments and a resin; a metal film; and a porous film. The thickness of the reflective layer is not particularly limited as long as a desired reflectance may be obtained, and is appropriately set.

The method for forming the LED substrate may be similar to a known method for forming.

3. Other Components

Figure 20:
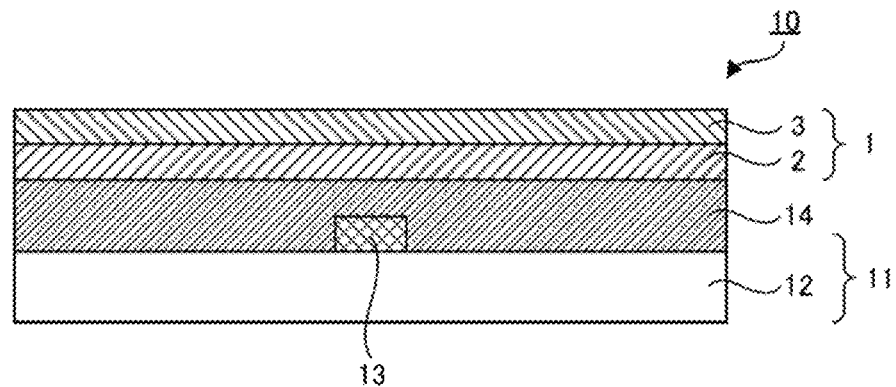
FIG. 20 is a schematic cross-sectional view illustrating an example of an LED backlight in the present disclosure.

In the LED backlight in the present disclosure, the space between the LED substrate and the diffusion member may be a space as illustrated in FIG. 2, for example, and sealing member 21, 14 configured to seal the LED element may be placed as illustrated in FIGS. 19 and 20.

When there is a space between the LED substrate and the diffusion member, a spacer may be placed between the LED substrate and the diffusion member. The spacer may be similar to a spacer used in a common LED backlight.

Further, as described above, when the size of the LED element is small, it is possible to place the LED element at a high density, that is, to reduce the interval (pitch) between the LED elements, the luminance unevenness may be suppressed, even when the distance between the LED substrate and the diffusion member is shortened. When the distance between the LED substrate and the diffusion member is short as described above, the sealing member may be placed between the LED substrate and diffusion member.

(1) Sealing Member

The sealing member in the present disclosure is placed on the LED element side surface of the LED substrate, and is a member configured to seal the LED element. The sealing member has a light transmissivity and is placed on the light emitting surface side of the LED substrate.

Incidentally, the terms "light transmissivity" and "transparent" in the sealing member may be transparent to such an extent that the visibility of the light from the LED element is not impaired.

The material included in the sealing member in the present disclosure is not particularly limited as long as it is a material capable of sealing the LED element, and examples thereof may include a thermosetting resin, a photocurable resin, and a thermoplastic resin.

Among the above, the thermoplastic resin is preferable. Incidentally, the reason why the thermoplastic resin is preferable is described in the section of "B. Stacked body" above, and therefore, description thereof will be omitted here.

The thermoplastic resin used in the sealing member in the present disclosure is similar to the thermoplastic resin described in the section "B. Stacked body, 2. Sealing material sheet" above.

As the thermosetting resin used in the sealing member in the present disclosure, a thermosetting resin commonly used for a sealing member of an LED backlight may be employed, and examples thereof may include a silicone based resin and an epoxy based resin.

As the photocurable resin used in the sealing member in the present disclosure, a photocurable resin commonly used for a sealing member of an LED backlight may be employed.

For example, as illustrated in FIG. 19, the sealing member in the present disclosure may be a single layer member wherein sealing member 21 includes a single resin layer, and as illustrated in FIG. 21, sealing member 21 may be a multi-layer member wherein a plurality of resin layers (three layers in FIG. 21) are stacked. For example, as illustrated in FIG. 21, sealing member 21 may be a three-layered structure of skin layer 22a, core layer 23, and skin layer 22b.

The structure of the sealing member may be similar to the structure of the sealing material sheet in the stacked body described above.

In the present disclosure, the sealing member is preferably a member formed using a sealing material sheet includes a sealing material composition including a thermoplastic resin. Incidentally, the sealing material composition may be similar to the sealing material composition used for the sealing material sheet in the stacked body described above.

The details of the sealing member may be similar to those described in the section "B. Stacked body, 2. Sealing material sheet" above.

The thickness of the sealing member is appropriately set according to the distance between the diffusion member and the light emitting surface of the LED element of the LED substrate described above.

(2) Wavelength Conversion Member

The wavelength conversion member is usually placed on the light emitting surface side of the LED substrate and is placed on the observer side than the LED element. In the LED backlight in the present disclosure, the wavelength conversion member may be placed on the first layer side surface or the second layer side surface of the diffusion member. Further, as the arrangement of the wavelength conversion member when the sealing member is placed, as illustrated in FIG. 22A for example, wavelength conversion member 41 may be placed on second layer 3 side surface of diffusion member 1; and as illustrated in FIG. 22B, wavelength conversion member 41 may be placed between diffusion member 1 and sealing member 21. The wavelength conversion member may be similar to the wavelength conversion member described in the section "A. Diffusion member" above.

(3) Optical Member

In the LED backlight in the present disclosure, the optical member may be placed on the second layer side surface of the diffusion member. The optical member may be similar to the optical member described in the section "A. Diffusion member" above.

II. Second Embodiment of LED Backlight

The second embodiment of the LED backlight in the present disclosure is a device comprising: an LED substrate including a plurality of LED elements placed on one surface side of a supporting substrate, and a diffusion member placed on the LED element side surface of the LED substrate, wherein the diffusion member includes a transmission type diffractive grating or a microlens array, and a dielectric multi-layer, in this order from the LED substrate side. The LED backlight in the present embodiment is a downlight type system LED backlight.

In the LED backlight in the present embodiment, the similar effect as that of the first embodiment of the LED backlight described above may be achieved.

The diffusion member in the present embodiment is similar to the member described in the section "A. Diffusion member, II. Second embodiment" above. Since respective members constituting the diffusion member may be similar to those described in the section "A. Diffusion member, II. Second embodiment" above, and description thereof is omitted herein.

The distance between the diffusion member and the light emitting surface of the LED element of the LED substrate may be similar to that of the first embodiment of the LED backlight described above.

The LED substrate in the present embodiment may be similar to the LED substrate in the first embodiment of the LED backlight described above.

The other members in the present embodiment may be similar to the other members in the first embodiment of the LED backlight described above.

D. Displaying Apparatus

The displaying apparatus in the present disclosure is a device comprising a display panel, and the LED backlight described above placed on a rear side of the display panel.

Figure 23:
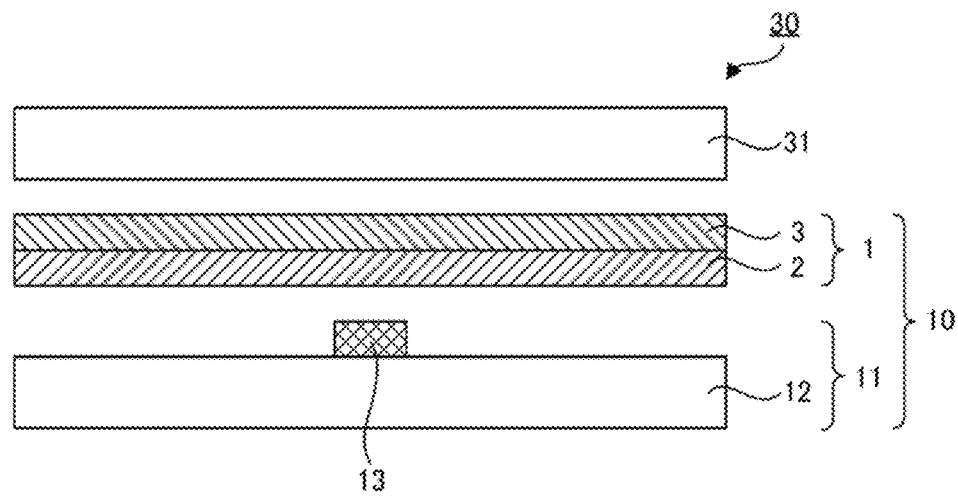
FIG. 23 is a schematic view illustrating an example of a displaying apparatus in the present disclosure.
Figure 24:
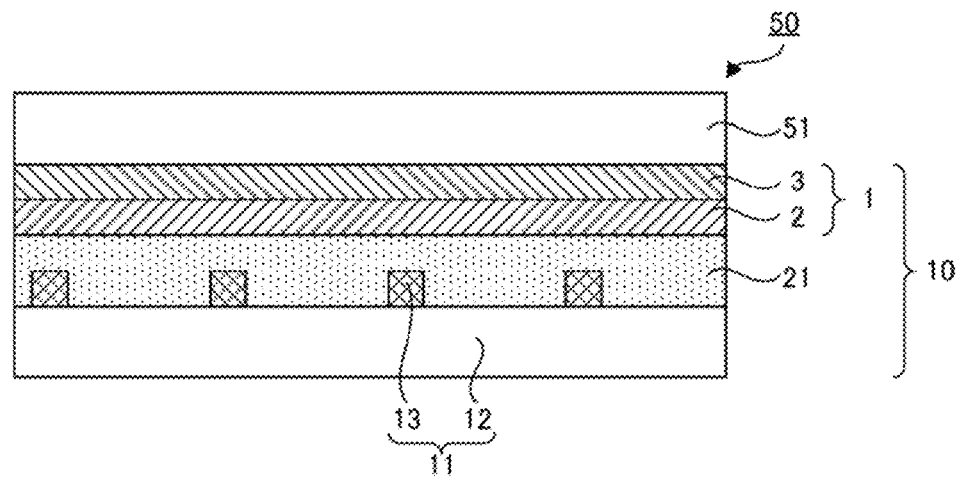
FIG. 24 is a schematic view illustrating an example of a displaying apparatus in the present disclosure.

FIGS. 23 and 24 are schematic diagrams illustrating an example of the displaying apparatus in the present disclosure. As illustrated in FIGS. 23 and 24, displaying apparatus 30 or 50 comprises display panel 31 or 51 and LED backlight 10 placed on a rear side of display panel 31 or 51.

According to the present disclosure, by including the LED backlight described above, the in-plane uniformity of luminance may be improved, while reducing the thickness. Further, the cost and power consumption may also be reduced. Therefore, a high quality displaying apparatus may be obtained.

Hereinafter, the respective configurations in the displaying apparatus in the present disclosure will be described.

1. LED Backlight

The LED backlight in the present disclosure is similar to the member described in the section "C. LED backlight" above. The respective members constituting the LED backlight may be similar to those described in the section "C. LED backlight" above, and description thereof is omitted herein.

2. Display Panel

The display panel in the present disclosure is not particularly limited, and examples thereof may include a liquid crystal panel.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure is hereinafter explained in further details with reference to Examples.

An optical simulation was carried out to evaluate the in-plane uniformity of luminance. As the simulation, a ray tracing simulation was carried out with LightTools from Synopsys Co.

Test Example 1

Figure 25:
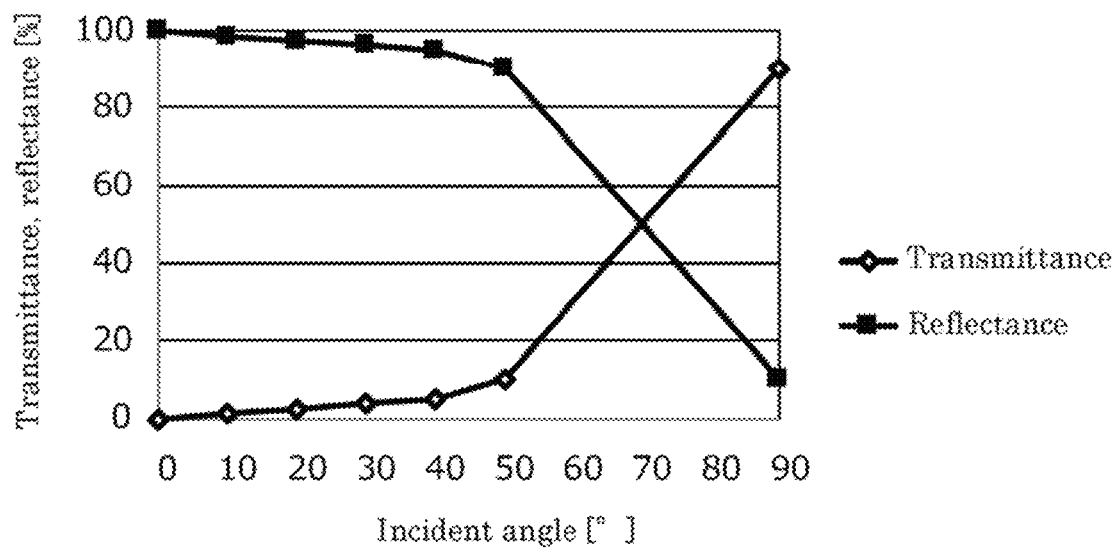
FIG. 25 is a graph showing an incident angle dependency in reflectance and transmittance of the second layer of the diffusion member in Test Example 1.
Figure 26:
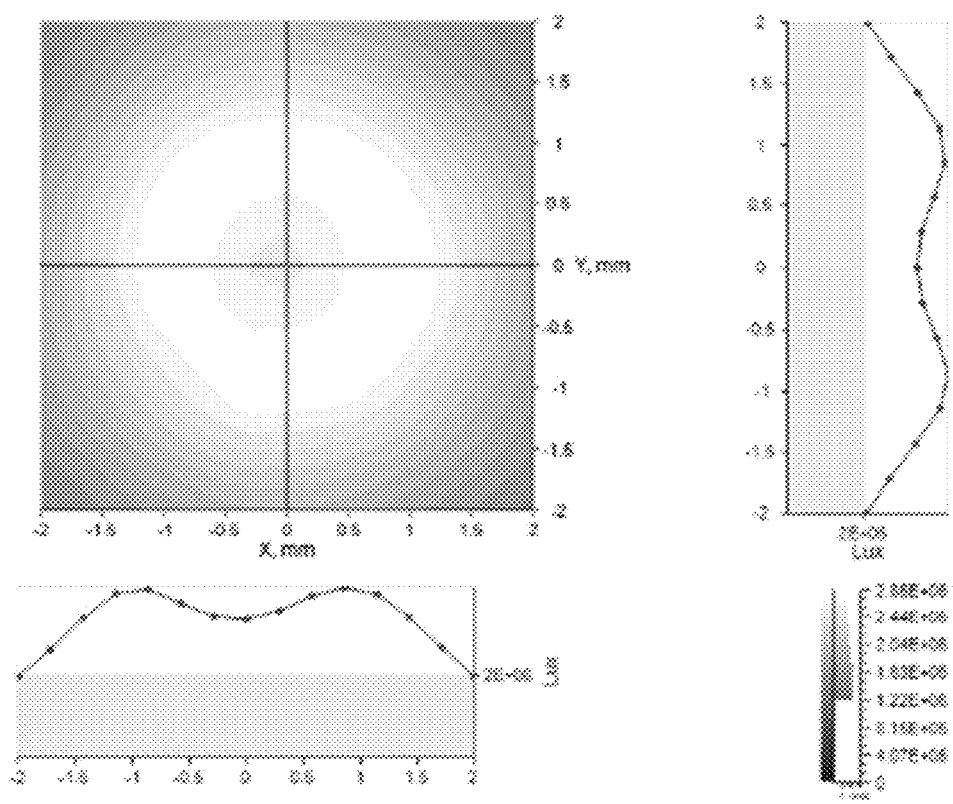
FIG. 26 is an optical simulation result in Test Example 1.

<Conditions>
Configuration: a diffusion member was placed above an LED substrate
Diffusion member: a diffusion member wherein a first layer having light transmissivity and light diffusivity; and a second layer having incident angle dependency in reflectance and transmittance, are stacked
Thickness of the diffusion member: 0.2 mm
Size of the diffusion member: 4 mm
Distance from the surface of the LED substrate to the diffusion member: 0.5 mm
Light transmissivity of the first layer of the diffusion member: overall transmittance of 98%
Light diffusivity of the first layer of the diffusion member: refracts an incident light to 45°
Incident angle dependency in reflectance and transmittance of the second layer of the diffusion member: see FIG. 25
FIG. 26 shows the simulation results.

Test Example 2

Figure 27:
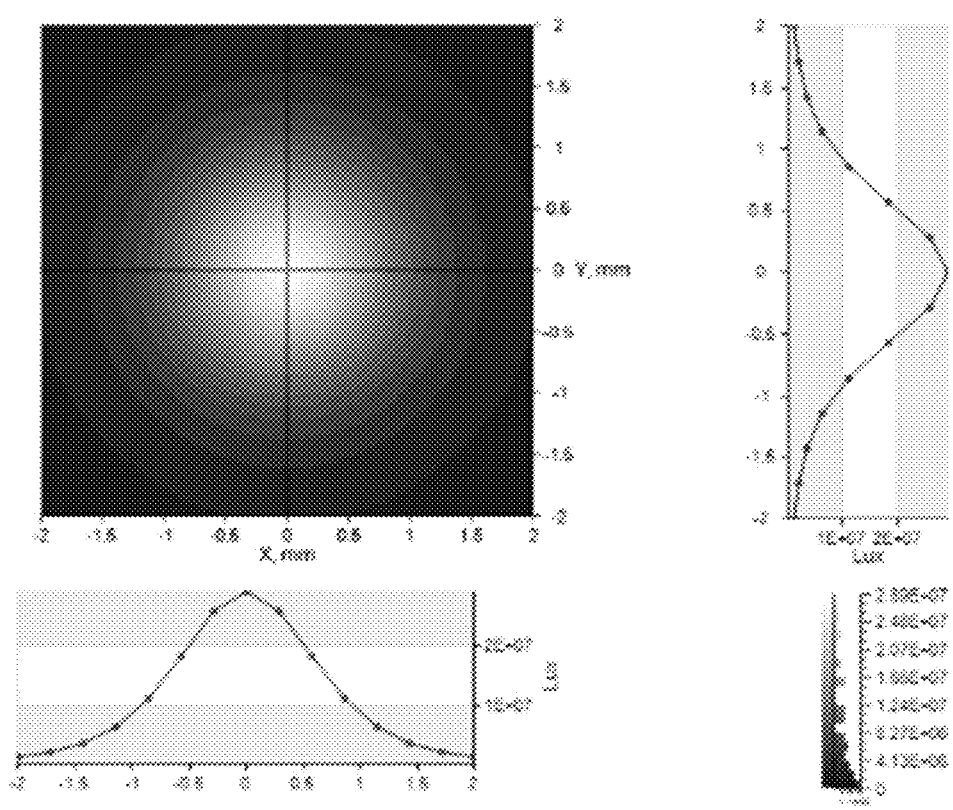
FIG. 27 is an optical simulation result in Test Example 2.

<Conditions>
Configuration: a diffusion plate was placed above an LED substrate
Diffusion member: a diffusion plate including particles
Light transmissivity and light diffusivity of the diffusion plate: overall transmittance of 95%, haze of 85%
Thickness of the diffusion member: 0.5 mm
Size of the diffusion member: 4 mm
Distance from the surface of the LED substrate to the diffusion member: 0.2 mm
FIG. 27 shows the simulation results.

Test Example 3

Figure 28:
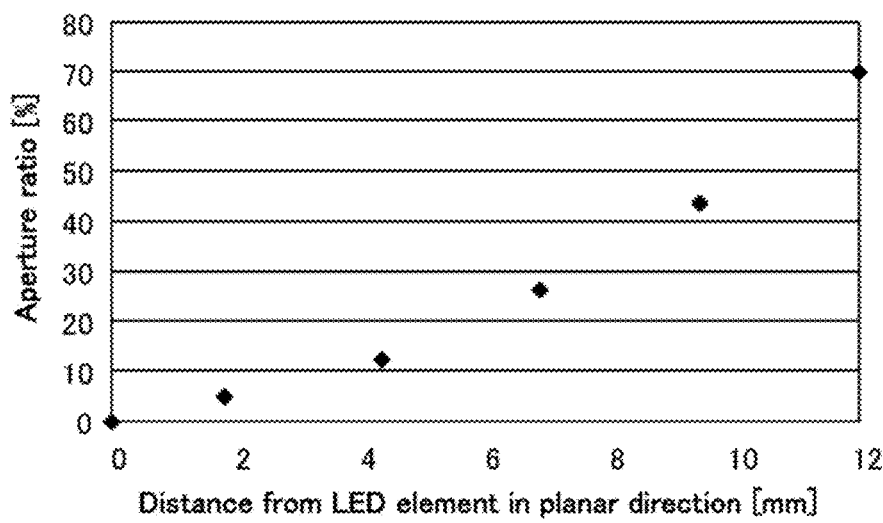
FIG. 28 is a graph showing the relationship between the location and aperture ratio of a through hole of a transmission reflector in Test Example 3.
Figure 29:
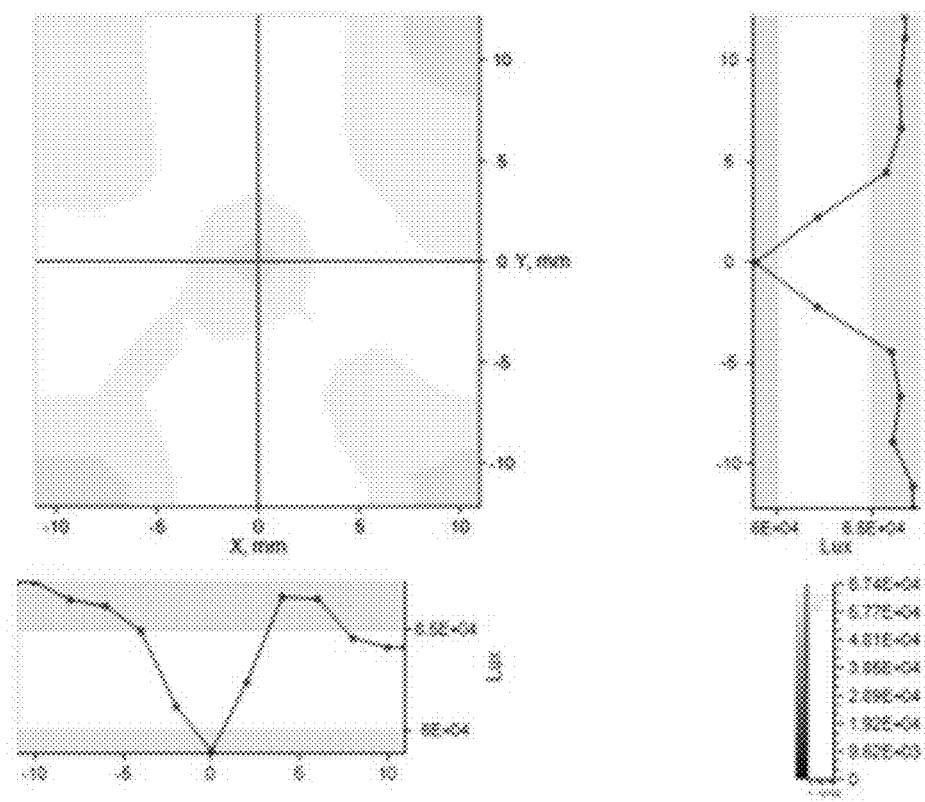
FIG. 29 is an optical simulation result in Test Example 3.

<Conditions>
Configuration: a transmission reflector and a diffusion member were placed above an LED substrate, in this order
Diffusion plate: a diffusion plate including particles
Light transmissivity and light diffusivity of the diffusion plate: overall transmittance of 95%, haze of 85%
Transmission reflector: a micro-cellular foamed light reflective sheet "MCPET" (0.5 mm thick) from Furukawa Electric Co., Ltd. was drilled to form a through hole, thereby fabricating a transmission reflector. The through hole was designed so that the diameter of the through hole located directly above the LED element was 0.25 mm and the diameter of the through hole was increased as it moved away from the LED element in planar direction. (See FIG. 28)
Thickness of the transmission reflector: 0.5 mm
Thickness of the diffusion plate: 2.4 mm
Size of the diffusion plate and transmission reflector: 24 mm
Distance from the surface of the LED substrate to the transmission reflector: 3.1 mm
FIG. 29 shows the simulation results.

Test Example 4

Figure 30:
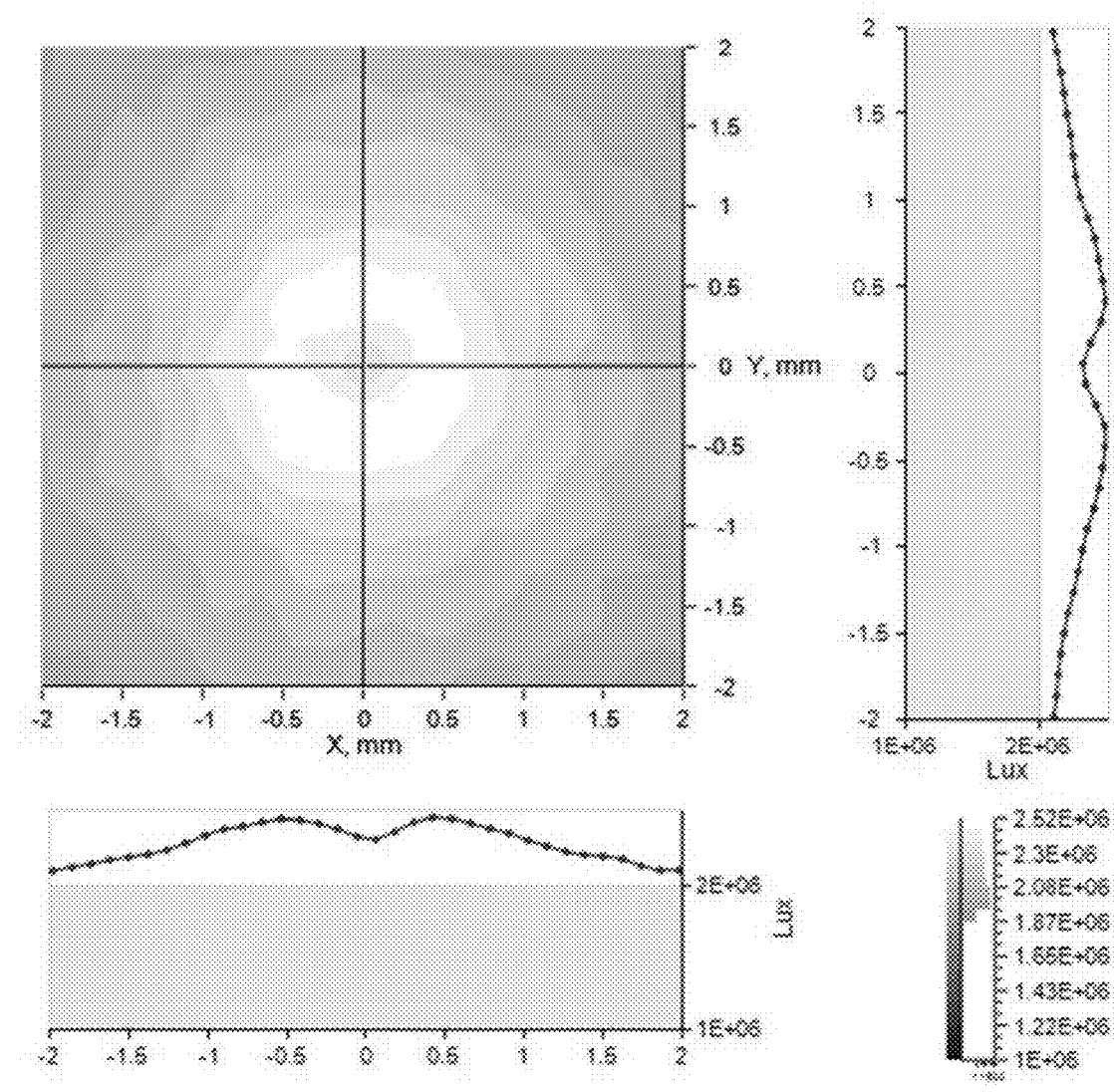
FIG. 30 is an optical simulation result in Test Example 4.

<Conditions>
Configuration: an optical member was placed above an LED substrate
Diffusion member: an optical member including only a second layer having incident angle dependency in reflectance and transmittance
Thickness of the optical member (second layer): 0.05 mm
Size of the optical member (second layer): 4 mm
Distance from the surface of the LED substrate to the optical member: 0.5 mm
Incident angle dependency in reflectance and transmittance of the optical member (second layer): see FIG. 25
FIG. 30 shows the simulation results.

[Evaluation]

As the result of the above simulation, the in-plane uniformity of luminance was improved in Test Example 1. Meanwhile, in Test Example 2, the luminance was uneven although the distance between the LED substrates and diffusion member was shorter than that in Test Example 1. From these results, it was confirmed that the configuration of the diffusion member in the present disclosure enables the reduction in the thickness while improving the in-plane uniformity of luminance.

Further, although the in-plane uniformity of luminance was excellent in Test Example 3, the distance between the LED substrate and the transmission reflector was longer than that in Test Example 1. From Test Examples 2 and 3, it was found out that when a conventional diffusion plate or transmission reflector was used, it was necessary to increase the distance between the LED substrate and the diffusion plate or the transmission reflector in order to achieve uniform luminance. From these results, it was confirmed that the configuration of the diffusion member in the present disclosure enables the reduction of the thickness and weight, while improving the in-plane uniformity of luminance, when a sealing member was placed between the LED substrate and the diffusion member, the diffusion plate, or the transmission reflector.

Also, in Test Example 1, the diameter of the white portion in the luminance distribution was larger than that in Test Example 4. From these results, it was confirmed that the in-plane uniformity of luminance was improved by employing the configuration of the diffusion member in the present disclosure.

REFERENCE SIGNS LIST

1: diffusion member
2: first layer
3: second layer
10: LED backlight
11: LED substrate
12: supporting substrate
13: LED element
14, 21: sealing member
21a: sealing material sheet
15: reflective layer
30, 50: displaying apparatus
31, 51: display panel
40: stacked body
60: diffusion member set
61: first member
62: second member

The invention claimed is:

1. A diffusion member comprising a first layer and a second layer, in this order, wherein
the first layer has a light transmissivity and a light diffusivity, and
the second layer is a dielectric multi-layer in which a reflectance of light increases as an absolute value of an incident angle with respect to a first layer side surface of the second layer decreases, and a transmittance of light increases as an absolute value of an incident angle with respect to a first layer side surface of the second layer increases.

2. The diffusion member according to claim 1, wherein the first layer is a transmission type diffractive grating or a microlens array.

3. The diffusion member according to claim 1, wherein the first layer is placed on one surface of the second layer directly, or via an adhesive layer or a pressure-sensitive adhesive layer.

4. The diffusion member according to claim 1, wherein the first layer in a pattern form is placed on one surface of the second layer.

5. The diffusion member according to claim 1, wherein the first layer is placed on one surface of the second layer via a void portion.

6. A stacked body comprising:
the diffusion member according to claim 1, and
a sealing material sheet placed on a first layer side surface of the diffusion member, and configured to seal an LED element,
wherein the sealing material sheet includes a sealing material composition containing a thermoplastic resin.

7. The stacked body according to claim 6, wherein the thermoplastic resin is an olefin based resin.

* * * * *